United States Patent [19]
Takano et al.

[11] Patent Number: 6,078,765
[45] Date of Patent: Jun. 20, 2000

[54] IMAGE FORMING APPARATUS

[75] Inventors: Tadashi Takano; Hideaki Nagahara; Daigo Nakagawa, all of Toride, Japan

[73] Assignee: Canon Kabushiki Kaisha, Tokyo, Japan

[21] Appl. No.: 09/175,449

[22] Filed: Oct. 20, 1998

[30] Foreign Application Priority Data

| Oct. 28, 1997 | [JP] | Japan | 9-295203 |
| Nov. 7, 1997 | [JP] | Japan | 9-305514 |
| Nov. 10, 1997 | [JP] | Japan | 9-307049 |

[51] Int. Cl.[7] .................................................. G03G 15/20
[52] U.S. Cl. ........................................... 399/124; 399/107
[58] Field of Search ............................. 399/21, 107, 124, 399/125, 361, 363, 365, 367, 369, 381, 405; 358/496, 498

[56] References Cited

U.S. PATENT DOCUMENTS

| 4,671,644 | 6/1987 | Sumida et al. ........................... 399/124 |
| 5,151,742 | 9/1992 | Yamaguchi ........................... 399/405 X |
| 5,331,374 | 7/1994 | Abe et al. ................................. 399/124 |
| 5,438,391 | 8/1995 | Maekawa et al. ....................... 399/125 |
| 5,614,992 | 3/1997 | Kikuchi et al. .......................... 399/124 |
| 5,790,922 | 8/1998 | Takano ....................................... 399/94 |
| 5,884,117 | 3/1999 | Tanoue et al. ...................... 358/496 X |

*Primary Examiner*—Sandra Brase
*Attorney, Agent, or Firm*—Fitzpatrick, Cella, Harper & Scinto

[57] ABSTRACT

An image forming apparatus has an image reading portion provided in an upper portion of an apparatus body on the side of its front surface, an optical signal generating portion provided in rear of the image reading portion, an image forming portion disposed downwardly of the optical signal generating portion, a fixing portion provided in the vicinity of a lower portion of the apparatus body on its front surface side, a sheet discharge portion, disposed between the image forming portion, the optical signal generating portion and the image reading portion, to which to discharge the record sheet onto which a toner image is fixed by the fixing portion, and an opening/closing cover rotated integrally with the image reading portion and the sheet discharge portion. When the opening/closing cover is opened, the image forming portion is exposed and a part of a sheet carry path extending from the fixing portion to the sheet discharge portion is made open. It is therefore possible to easily replace and repair the parts of the image forming portion and also operate a jam treatment of the record sheets.

12 Claims, 18 Drawing Sheets

FRONT FACE OF APPARATUS BODY →

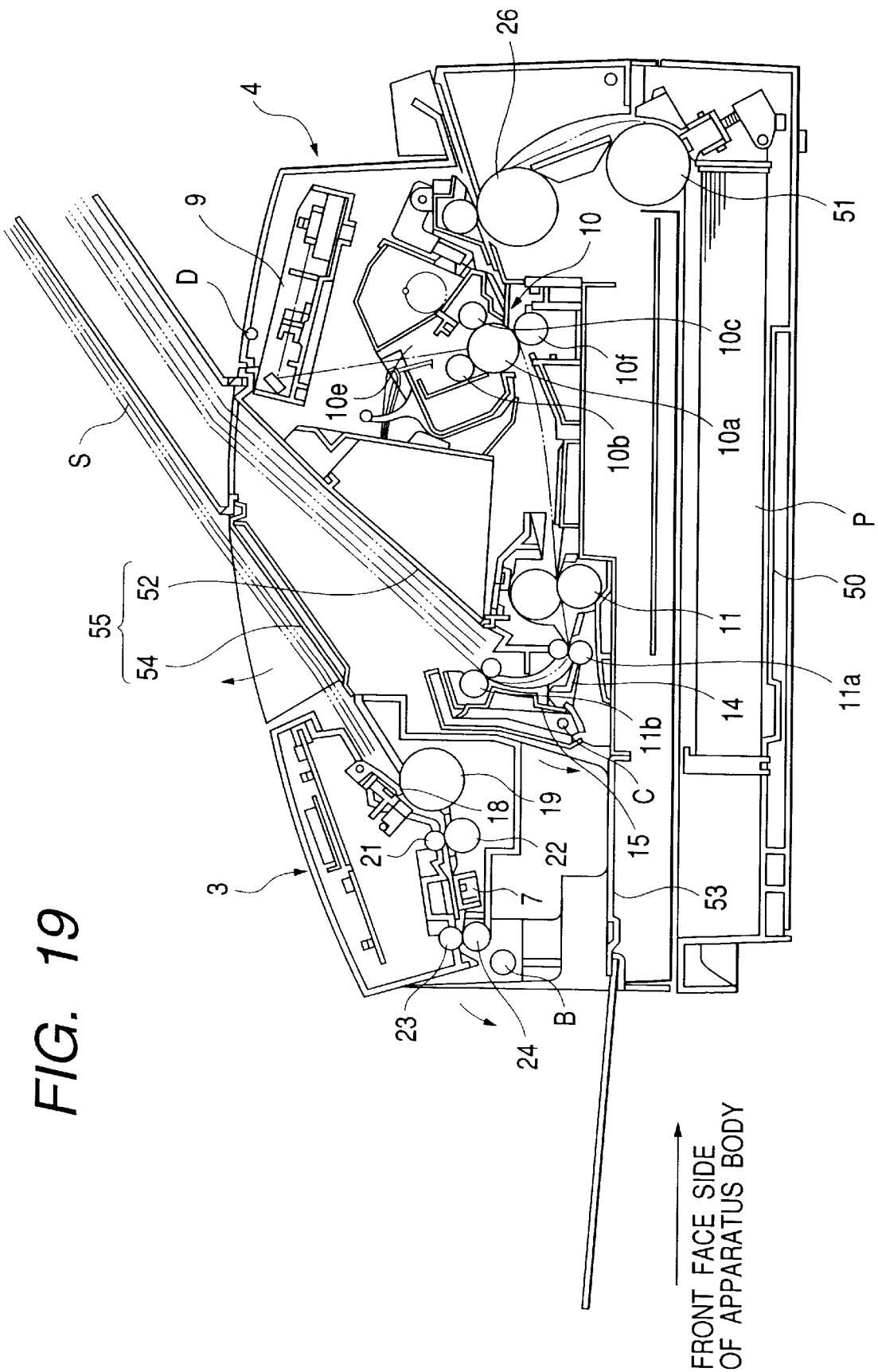

IMAGE FORMING APPARATUS

BACKGROUND OF THE INVENTION

1. Field of the Invention

The present invention relates generally to an image forming apparatus for reading image information on an original sheet, and forming and recording an image on a record medium such as a sheet of paper and, more particularly, to an image forming apparatus for forming and recording the image based on an electronic photographic recording system.

2. Related Background Art

As an example of this type of conventional image forming apparatus, a facsimile apparatus in which a recording portion for forming and recording the image is constructed as a laser beam printer based on the electronic photographic system, is known as U.S. patent application Ser. No. 08/812,496 now U.S. Pat. No. 5,790,932, and a construction thereof will be explained with reference to FIG. 19.

Referring to FIG. 19, an image reading portion 3 for reading the image information on the original sheet is provided in an upper portion of an apparatus body on the side of its front surface. A recording portion 4 for forming and recording the image is provided in rear of the image reading portion 3.

To start with, a construction of the recording portion 4 is explained. In the recording portion 4, an uppermost sheet among record sheets P stacked in a cassette portion 50 is fed by a pick-up roller 51 and sent to an image forming portion 10 by a carry roller 26. A laser scanner 9 is disposed upwardly of the image forming portion 10, and a fixing portion 11 is disposed closer to the front surface side of the apparatus body than the image forming portion 10. Based on an image signal, the laser scanner 9 scans the surface of a photosensitive drum 10a of the image forming portion 10 by its laser beams serving as scan beams. Before this scan, the surface of the photosensitive drum 10a is uniformly charged by a primary charger 10b and then irradiated with the scan beams from the laser scanner 9, thereby forming a static latent image thereon. The latent image becomes a visible image as a toner image when toners supplied from a developing roller 10c are adhered to the latent image. Further, the toner image is transferred onto the record sheet P by a transfer charger 10f and thereafter fixed by a fixing portion 11.

After being fixed, the record sheet P, though discharged, must be discharged so that a record content can be confirmed with a recording surface directed upward, which is a so-called face-up sheet discharge. In the case of this sheet discharge, the sheets are discharged on a sheet discharge cover 53 by a pair of sheet discharge rollers 11a. Further, in the case of a so-called face-down sheet discharge in which the sheets are discharged with the recording faces directed downward so as to set the output pages in sequence, the sheets are discharged on a face-down sheet discharge portion 52 by the pair of sheet discharge rollers 11a, 11b. Note that the face-up and face-down sheet discharge modes are selected by switching a flapper 14.

Next, a construction of the image reading portion 3 is described. In the image reading portion 3, original sheets S placed on an original sheet placing board 54 are singly separated by a separation roller 19 in combination with a friction piece 18 and carried to a close-fitted image sensor 7 by a sheet feed roller 21 and a sheet feed roller 22. Then, the image information on the original sheets S are read, and thereafter the sheets are discharged on an original sheet discharge tray 8 by a sheet discharge roller 23 and a sheet discharge roller 24.

Further, the image reading portion 3 is rotatable from the illustrated position about a fulcrum B counterclockwise in the Figure, and a face-down sheet discharge guide 15 is rotatable counterclockwise about a fulcrum C. The original sheet placing board 54 and the face-down sheet discharge portion 52 are integrally constructed as a cartridge cover 55, and this cover 55 is rotatable clockwise about a fulcrum D.

When replacing a toner cartridge 10e constructed integrally with the photosensitive drum 10a, the charger 10b, the developing roller 10c and a toner storing portion, the cartridge cover 55 is opened by rotating clockwise this cover 55, thus replacing the toner cartridge 102. Further, if a record sheet jam occurs, the image reading portion 3 is rotated counterclockwise, and next the face-down sheet discharge guide 15 is rotated counterclockwise, and the jammed record sheets are taken out.

There arise, however, the following defects inherent in the prior art apparatus.

First, because of such a structure that the toner cartridge 10e is, when replaced, taken out and in from above by opening the cartridge cover 55, it is required that an area of the cover 55 which covers the image forming portion 10 be larger than at least a projection area of the toner cartridge 10e. It is also required that a size thereof be set with some allowance so that the hands of an operator does not touch on the apparatus when taking out and in the toner cartridge. Then, a large dead space might be formed at an upper central portion of the apparatus body in order to make the large cover 55 rotatable clockwise in FIG. 19 so as not to impinge upon the image reading portion 3. Accordingly, this might hinder downsizing of the apparatus.

Second, in the construction given above, if the record sheets are jammed, the image reading portion 3 is rotated counterclockwise, and next the face-down sheet discharge guide 15 is rotated counterclockwise, thus taking out the jammed record sheets. This structure has such an inconvenience that both of the image reading portion 3 and the face-down sheet discharge guide 15 must be always opened when executing the jam treatment.

SUMMARY OF THE INVENTION

It is a primary object of the present invention, which was devised under such circumstances, to provide an image forming apparatus capable of easily replacing a toner cartridge of an image forming portion and executing a jam treatment of record media.

It is another object of the present invention to facilitate a discharge operation of the record media.

It is a further object of the present invention to facilitate an automatic sheet feed of original sheets or the record media.

BRIEF DESCRIPTION OF THE DRAWINGS

FIG. 19 is a sectional view showing a construction of a prior art facsimile apparatus.

DESCRIPTION OF THE PREFERRED EMBODIMENTS

Embodiments of the present invention will hereinafter be described with reference to the accompanying drawings.

To start with, a first embodiment of the present invention will be explained referring to FIGS. 1 to 6, wherein the same components as those in the prior art are marked with the like numerals throughout the drawings.

Herein, a facsimile apparatus is exemplified as an image forming apparatus.

The facsimile apparatus is herein described in the following sequence.

(1) Brief explanation of respective portions of the facsimile apparatus.

(2) Dispositions of the respective portions.

(3) Construction of an image reading portion for reading image information on a sheet.

(4) Construction of a recording portion for forming and recording the image.

(5) Construction relative to an opening/closing cover.

(6) Construction for replacing components of a control portion for controlling the whole apparatus.

(7) Construction of a control system including the control portion described above.

[Brief Description of Respective Portions of Facsimile Apparatus]

To begin with, respective portions of a facsimile apparatus in an embodiment will be briefly explained.

Figure 1:
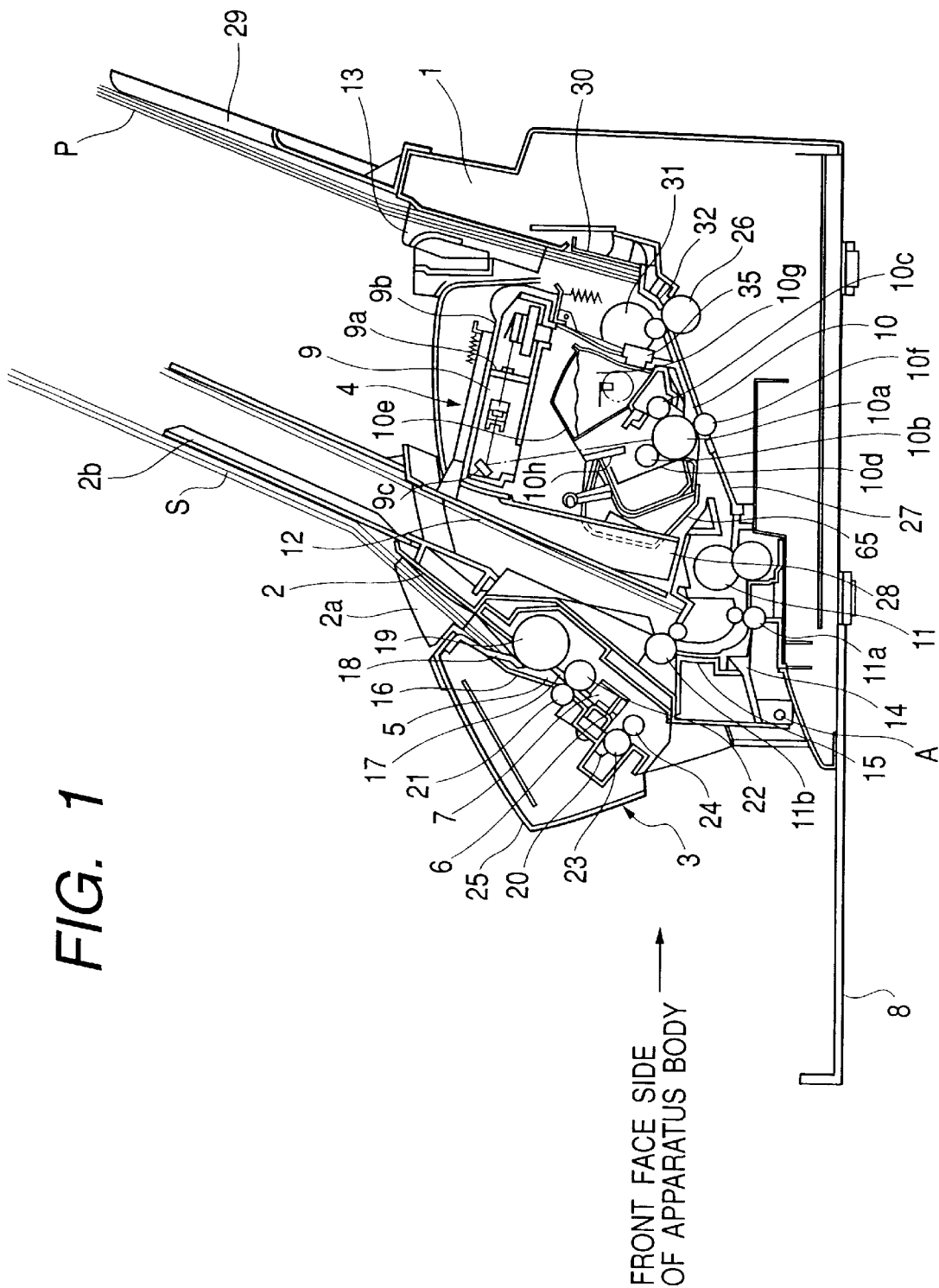
FIG. 1 is a sectional view showing a construction of a facsimile apparatus in a first embodiment of the present invention.
Figure 2:
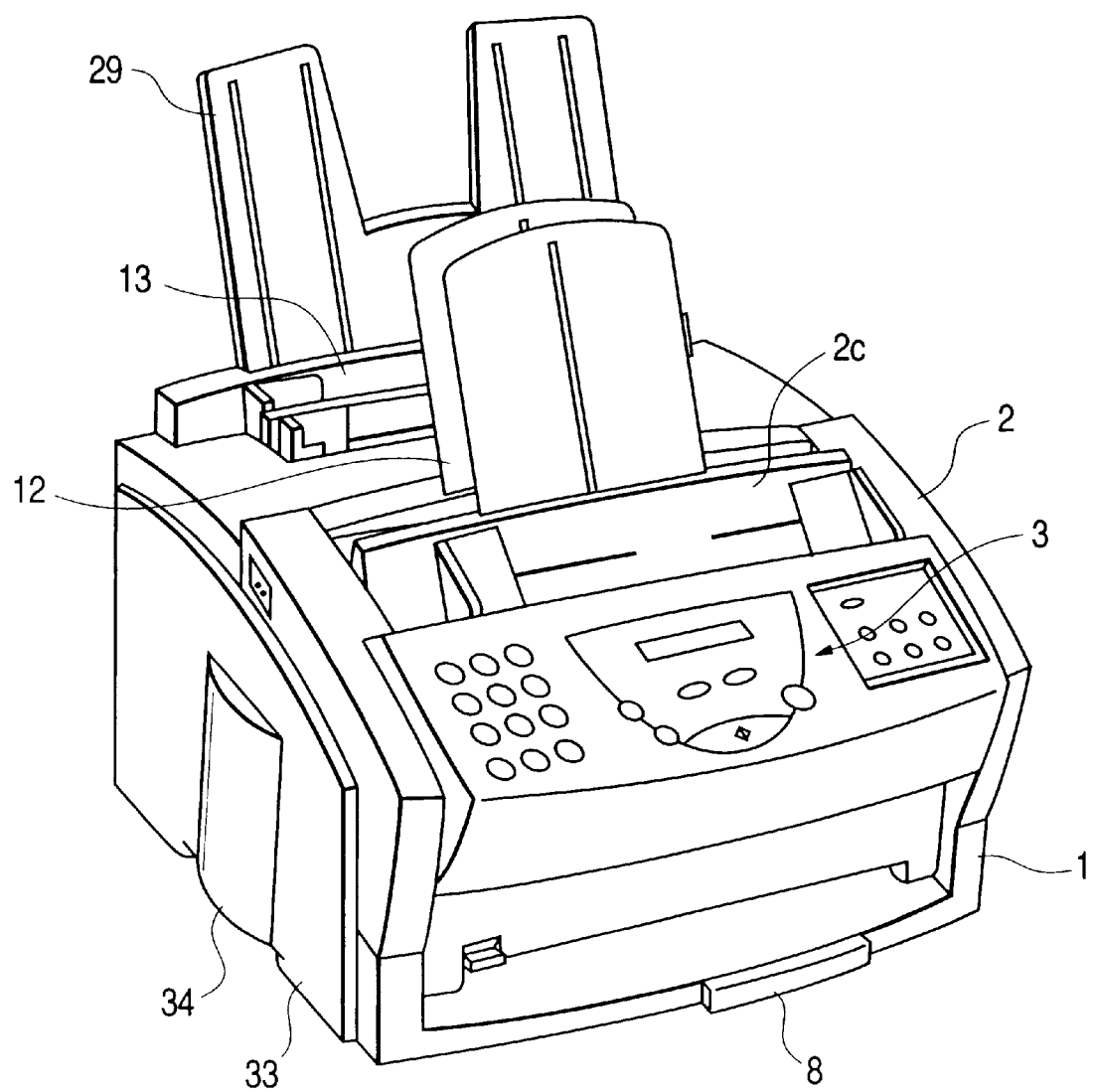
FIG. 2 is a perspective view showing an external appearance of the whole apparatus shown in FIG. 1.

FIG. 1 is a sectional view showing a construction of the facsimile apparatus in the embodiment.

Referring to FIG. 1, there are an apparatus body designated by 1, an opening/closing cover 2 so constructed as to have a sheet placing board 2C capable of stacking up a plurality of copies S, and opened and closed for replacing a toner cartridge which will be mentioned later on or for treating a jam of record sheets, an image reading portion 3 for reading image information from the original sheet S, a recording portion 4, constructed as a laser beam printer, for forming and recording an image on a record sheet P, a sheet carrying portion 5 for carrying the sheet to an image sensor portion, a sheet pressing portion 6 for pressing the sheet against the image sensor, a close-fitted type image sensor 7 for reading the image information from the sheet, a paper discharge tray 8 to which the original sheet S after being read or the record sheet P when in a face-up discharge process is sent, a laser scanner 9 defined as an optical signal generating portion, an image forming portion 10 for forming a toner image by irradiating the recording portion 4 with an optical signal of the laser scanner and transferring the toner image onto the record sheet P, a fixing portion 11 for fixing the toner image transferred onto the record sheet P, a face-down paper discharge portion 12 for effecting a face-down discharge of the record sheet P after being fixed, a sheet feeding portion 13 for supporting the record original sheet supplied to the image forming portion 10, a carry path switching flapper 14 for switching over a carry path of the record sheet fed from the fixing portion 11 in order to switch over a face-down sheet discharge process and a face-up sheet discharge process, a face-down sheet discharge guide 15 for guiding the record sheet P after being fixed to the face-down sheet discharging portion, upper and lower sheet guides 16, 17 for guiding the original sheet S, an operation portion 25 for executing a variety of operation input processes, carry rollers 26 for carrying the record sheet P to the image forming portion 10 from the sheet feeding portion 13, a carry guide 27 for guiding the record sheet P, and a radiation duct 28 for radiating the heat of the fixing portion 11.

[Dispositions of Respective Portions]

Next, dispositions of the individual portions of the apparatus will be explained. At first, the image reading portion 3 is provided on an upper portion of the apparatus body on its front side, and the laser scanner 9 is provided in rear of this image reading portion 3. Further, the image forming portion 10 is provided downwardly of the laser scanner 9, and the fixing portion 11 is provided posterior to the image reading portion 3 and in a lower portion of the apparatus body on its front side as well as being in the vicinity of the image forming portion 10. Moreover, the face-down sheet discharge portion 12 is provided between the laser scanner 9, the image forming portion 10 and the image reading portion 3. Further, the sheet feeding portion 13 is provided behind the laser scanner 9 and the image forming portion 10 as well.

[Construction of Image Reading Portion]

Next, a construction of the image reading portion is described. In the construction of the image reading portion 3, to begin with, the sheets S placed on the sheet placing board 2C are separated and fed sheet by sheet by a separation roller 19 brought into a press-contact with a friction member 18. Subsequently, the thus separated sheets S are carried to the close-fitted type image sensor 7 by a sheet feeding roller 21 pressed by a pressing spring 20 and by a sheet feeding roller 22 set in the press-contact with the roller 21. Using the sheet pressing portion 6, the original sheet S is close-fitted by pressing to the close-fitted type image sensor 7, and the image sensor 7 reads the image information on the original sheet S. Thereafter, the original sheet S is discharged into the sheet discharge tray 8 by a sheet discharge roller 23 pressed by the pressing spring 20 and by a sheet discharge roller 24 set in the press-contact with this roller 23. Note that during this discharging process the original sheet S is guided by the upper and lower sheet guides 16, 17.

The sheet placing board 2C is so provided as to be inclined at a steep angle as close as a vertical direction, and is, because if the original sheet S placed thereon being guided by its self-weight to the separation roller 19, constructed compact enough to eliminate the necessity for a preparatory carrying portion. Further, the sheet placing board 2C is provided with a slider 2a slidable in a direction (a widthwise direction of the original sheet S) orthogonal to a carrying direction of the original sheet S, and both sides of the sheets S placed on the sheet placing board 2C can be set uniformly by the slider 2a. Further, if the original sheet S is comparatively elongated, a read edge of the original sheet S can be prevented by the sheet tray 2b from protruding and hanging down from the sheet placing board 2C.

[Construction of Recording Portion]

Next, a construction of the recording portion 4 is described. The recording portion 4 emits a light beam of a modulation signal from a laser beam transmitter 9a of the laser scanner 9 on the basis of an image signal outputted from a control portion 300 which will hereinafter be described. A photosensitive drum 10a of the image forming portion 10 is irradiated with the modulation beam through a polygon mirror 9b, thereby forming a toner image corresponding to the image information on a surface of the photosensitive drum 10a. The toner image is then transferred onto the record sheet P fed to the image forming portion 10 from the sheet feeding portion 13, and is further fixed by the fixing portion 11. Thereafter, this record sheet P is discharged onto the face-down sheet discharge portion 12 or the sheet discharge tray 8. This is how the recording portion 4 is structured.

The photosensitive drum 10a is incorporated into a toner cartridge 10e integrally with a primary charger 10b, a developer roller 10c and a cleaning blade 10d. The photosensitive drum 10a is so constructed as to be attachable and detachable together with the toner cartridge 10e from the apparatus body 1. Note that the apparatus body is provided with a magnetic sensor 35 in contact with the toner cartridge 10e in order to detect whether or not the toners exist in a toner chamber 10g stored with the toners of the toner cartridge 10e.

Then, the photosensitive drum 10a is constructed such that the surface thereof is uniformly charged by the primary charger 10b, then irradiated with a scan beam via a deflection mirror 9c from the polygon mirror 9b, and is thereby formed with an electrostatic latent image. The latent image is then mad visible as a toner image when adhered with the toners supplied from the developing roller 10c.

A transfer charger 10f is disposed under the photosensitive drum 10a of the image forming portion 10. Further, in the fixing portion (a thermal fixing portion) 11, a pair of sheet discharge rollers 11a and a pair of face-down sheet discharge rollers 11b are disposed along a record sheet carry path located more downstream than the photosensitive drum 10a.

On the other hand, the record sheets P placed on the record sheet tray 29 provided in the sheet feeding portion 13 provided at the rear portion of the apparatus body 1, are each brought into the press contact with the separation roller 31 upon a middle plate 30 being rotated clockwise by an unillustrated biasing mechanism, and separated sheet by sheet by a separation pad 32 (which is a friction member separation system). The record sheets P are thus carried by the carry roller 26 to between the photosensitive drum 10a and the transfer charger 10f.

The record sheet P is, after the toner image formed on the surface of the photosensitive drum 10a has been transferred by the transfer charger 10f, carried along the carry guide 27. Then, the toner image is fixed onto the record sheet P by the thermal fixing portion 11, and thereafter the record sheet P is fed to the couple of sheet discharge rollers 11a.

A user is able to select any one of the face-down sheet discharge mode and the face-up sheet discharge mode as discharge mode of the record sheet P. The mode is switched over by switching over the record sheet carry path upon a manipulation of the carry path switching flapper 14.

FIG. 1 shows a state of how the face-down sheet discharge is conducted. The record sheet P directed upward by the flapper 14 is guided by the face-down sheet discharge guide 15 provided more downstream than the flapper 14 along the record sheet carry path leading to the face-down sheet discharge portion 12 from the fixing portion 11 on the front side of the apparatus body, and then discharged onto the face-down sheet discharge portion 12 constructed integrally with the opening/closing cover 2 together with the radiation duct 28 by the pair of face-down sheet discharge rollers 11b.

Note that the radiation duct 28 is located upwardly of the fixing portion 11, and the heat generated by the fixing portion 11 is radiated upward along the radiation duct 28 according to a natural convection as well as being cut off by the radiation duct 28 so as not to be transmitted round to the toner cartridge 10e of the image forming portion 10.

The user, when selecting the face-up sheet discharge mode, changes the direction of the flapper 14 through an unillustrated switching lever, thus discharging the record sheet P toward the sheet discharge tray 8. The sheet discharge tray 8 serves as the face-up sheet discharge tray and also an original sheet discharge tray, and is structured as a drawer type, wherein the tray 8 can be, as illustrated in FIG. 1, drawn out or accommodated under the apparatus body 1 as shown in a sketch perspective view in FIG. 2 according to a usage of the user.

[Construction Related to Opening/Closing Cover]

Next, a construction related to the opening/closing cover 2 will be described.

The opening/closing cover 2 is provided rotatably clockwise and counterclockwise in FIG. 1 so that the cover 2 rotates about a fulcrum A positioned at a lower portion on the front side of the apparatus body shown in FIG. 1 and opens to the front side of the apparatus body 1 and closes to its rear side. The image reading portion 3, the face-down sheet discharge portion 12, the face-down sheet discharge guide 15, and the radiation duct 28 are constructed integrally with respect to the opening/closing cover 2, and are rotatably supported together with this cover 2.

Figure 3:
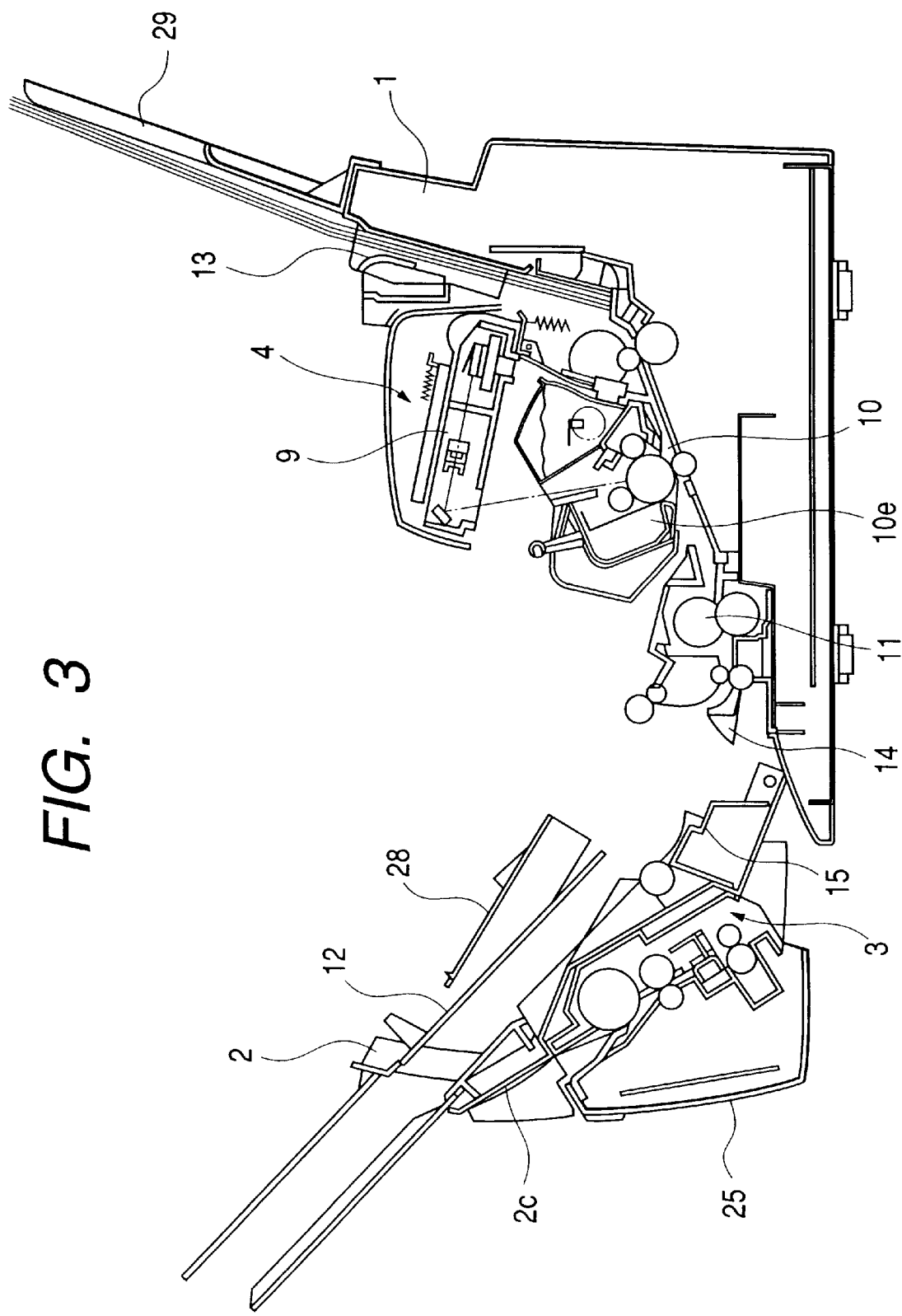
FIG. 3 is a sectional view showing a state where an opening/closing cover of the apparatus shown in FIG. 1 is opened.

Then, the opening/closing cover 2 is rotated counterclockwise in FIG. 1 so that the cover 2 opens together with the image reading portion 3, the face-down sheet discharge portion 12, the face-down sheet discharge guide 15 and the radiation duct 28, thereby making the image forming portion 10 exposed as shown in FIG. 3 and opening a portion disposed downstream of the switching flapper 14 of the record sheet carry path leading from the fixing portion 11 to the face-down sheet discharge portion 12. With this contrivance, the toner cartridge 10e of the image forming portion 10 can be easily taken outside and replaced with a new one. Further, if a jam of the record sheets P occurs, the record sheets P remaining inside the apparatus body 1 can be easily taken out.

Note that the opening/closing cover 2 is rotatable, whereby a dead space for taking the toner cartridge is not required to be formed in the apparatus body as in the case of the cartridge cover 55 in the prior art shown in FIG. 19. The apparatus can be thereby downsized.

Further, according to the facsimile apparatus in this embodiment, the opening/closing cover 2 is equipped with an interlock mechanism, and, if the cover 2 is opened or the toner cartridge 10e is not set in the apparatus body 1, a contrivance is that the recording portion does not operate.

Moreover, a drum photosensitivity preventing shutter 10h (see FIG. 1) provided in the toner cartridge 10e is constructed interlocking with setting of the toner cartridge 10e into the apparatus body 1. The shutter 10h opens when the cover 2 opens and when the toner cartridge 10e is set in the apparatus body 1. While on the other hand, the shutter 10h closes when the toner cartridge 10e is taken out of the apparatus body 1, thus preventing an unnecessary photosensitive process.

[Construction for Replacing Components of Control Portion]

Next, a construction for replacing and repairing the components of the control portion for controlling the whole apparatus, is described with reference to FIGS. 4 and 5.

Figure 4:
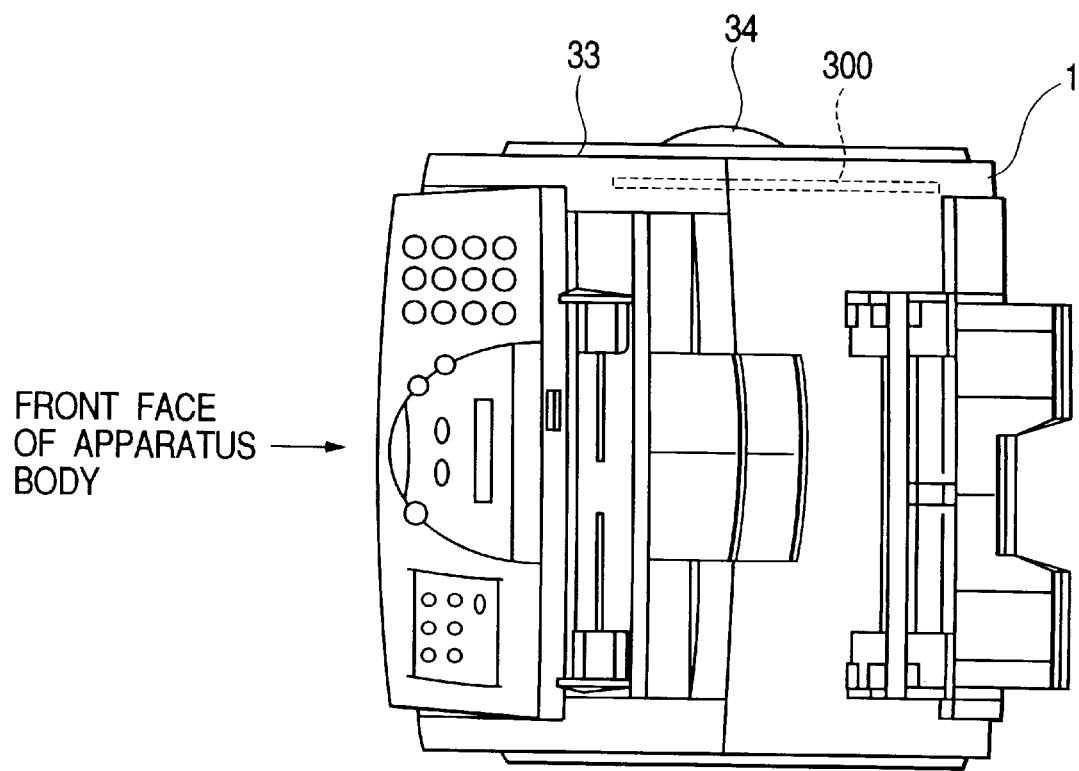
FIG. 4 is a plan view illustrating the apparatus shown in FIG. 1.

A control portion 300 shown in FIG. 4 is constructed by providing a circuit board with a control circuit etc. for controlling the whole apparatus, which will be mentioned later on. The control portion 300 is provided along inside of a side cover 33 for covering one side surface of the apparatus body.

Figure 5:
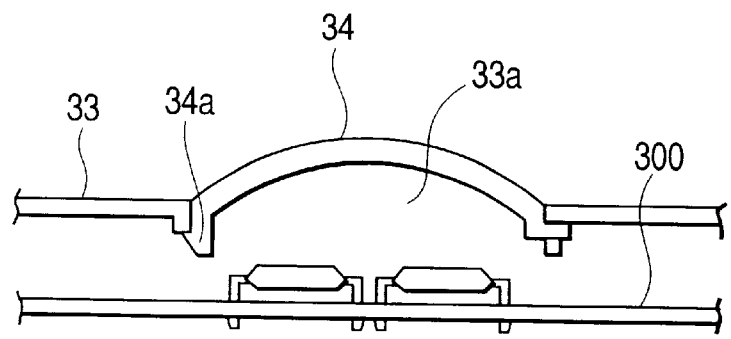
FIG. 5 is a view showing in details a control portion of the apparatus shown in FIG. 4.

As shown in FIG. 5, an opening portion 33a is formed in a portion, facing to the control portion 300, of the side cover 33, and a cover 34 for closing this opening portion 33a is so provided as to be attachable to and detachable from the side cover 33. The cover 34 is so secured to the side cover 33 by a pawl 34a as to be attachable thereto and detachable therefrom by utilizing an elasticity of the material thereof.

According to the construction described above, the components such as, e.g., a ROM and a RAM etc. incorporated into the control portion 300 can be replaced and extensively provided in the control portion 300 from outside the apparatus body 1 by removing the cover 34.

It is to be noted that the cover 34 may be set attachable and detachable from the side cover 33 by using a screw etc., or so provided that the cover 34 can be opened and closed with respect to the side cover through a hinge.

[Construction of Control System]

Next, a construction of a control system of the facsimile apparatus including the control portion 300 will be explained referring to FIG. 6.

Figure 6:
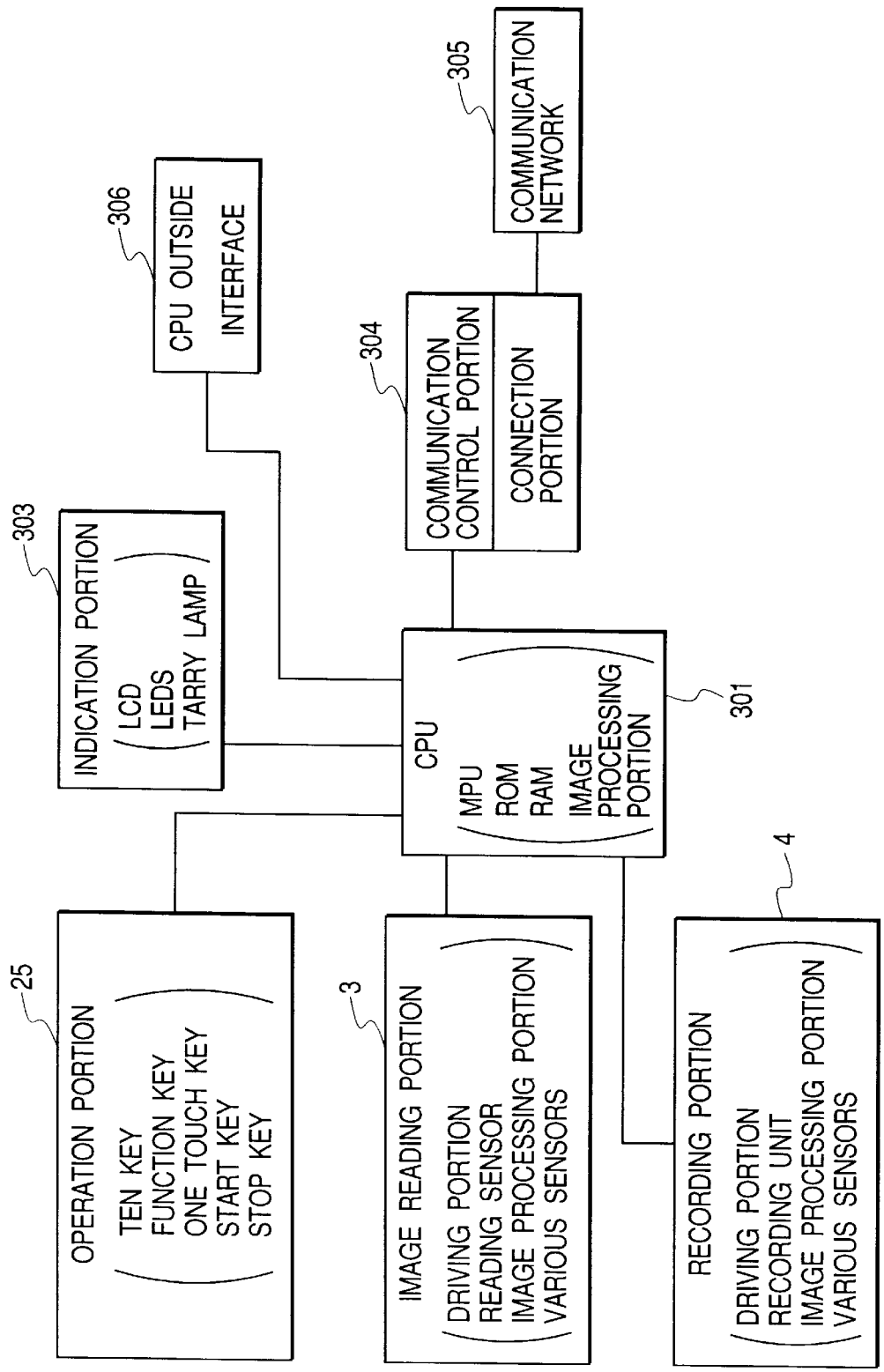
FIG. 6 is a block diagram of a control system of the apparatus shown in FIG. 1, including the control portion shown in FIG. 5.

Referring to FIG. 6, a CPU 301 controls the facsimile apparatus as a whole. The CPU 301 is constructed of an MPU, a ROM stored with a control program etc. of the MPU, a RAM used as a temporary storage portion of the image information and a work area for processing a variety of data, and an image processing portion for changing a magnification of the image and converting a resolution.

Further, the CPU 301 incorporates a calender function and a timer function of which structures are well known, and regions in the RAM which are stored with vital system setting information such as one-touch key destination information and software switch information etc., are protected by a battery backup from an unpredicted fault such as a power failure. The control system of the facsimile apparatus takes such a configuration that the CPU 301 is connected via an interface to the following elements.

An operation portion 25 is constructed of a variety of key switches such as ten keys, function keys, a one-touch key, a start key and a stop key.

An indication portion 303 is constructed of an LCD for indicating a variety of messages, and various LEDs for displaying a transmission mode etc.

The image reading portion 3 is constructed of a driving portion such as a reading motor, a reading sensor for reading the image, an image processing portion for shading and binarizing the read image, and a variety of sensors for detecting the original sheet and so on.

The recording portion 4 comprises a driving portion such as recording motor, a recording unit for controlling the laser scanner and an electronic photographic process, an image processing portion for executing a smoothing process of the image to be recorded, and a variety of sensors for detecting the record sheet and so forth.

A communication control portion 304 for transmitting and receiving a call and encoding the image data, has a connecting portion constructed of a MODEM and an NCU, and the connecting portion is connected to a communication network 305.

A CPU outside interface 306 is an interface for transmitting and receiving the data directly to and from the CPU 301, and is connected to a computer outside the apparatus via a circuit such as, for instance, RS232C, SCSI and LAN, whereby the apparatus is used as a scanner printer of the outside computer.

The above-described control portion 300 shall include at least a circuit of the CPU 301 in the construction explained in FIG. 6. The control portion 300 may be provided with the circuits of the communication control portion 304 and the CPU outside interface 306 together with the CPU 301.

In the first embodiment of the present invention discussed above, the facsimile apparatus using the laser scanner as an optical signal generating portion has been exemplified so far. The optical signal generating portion may also, however, involve the use of other scan systems such as, e.g., an LED scanner. Further, the construction of the image forming portion is, as a matter of course, not limited to the one described above. Moreover, the construction related to the present invention is not restricted to the facsimile apparatus, and it is taken for granted that the present invention can be applied to other image forming apparatuses for forming the image based on the electronic photographic system and recording the image on the recording medium.

As obvious from the description given so far, the image forming apparatus according to the first embodiment of the present invention comprises: the image reading portion, provided in the upper portion of the apparatus body on its front side, for reading the image information on the original sheet; the optical signal generating portion, provided in rear of the image reading portion, for generating the optical signal based on the image signal; the image forming portion, provided downwardly of the optical signal generating portion, for forming the toner image on the photosensitive body by irradiating it with the optical signal and transferring the toner image onto the recording medium; the fixing portion, provided behind the image reading portion and in the lower portion of the apparatus body as well as being in the vicinity of the image forming portion, for fixing the toner image transferred onto the recording medium; the medium discharging portion, provided between the image forming portion, the optical signal generating portion and the image reading portion, to which the recording medium onto which the toner image is fixed by the fixing portion is discharged; and the opening/closing cover rotatably provided so as to open to the front side of the apparatus body and close to the rear side thereof. The image reading portion and the medium discharging portion are constructed integrally with the opening/closing cover and rotatably supported. The opening/closing cover is rotated to open together with the image reading portion and the medium discharging portion, whereby the image forming portion is exposed and a part of the recording medium carry path leading to the medium discharging portion from the fixing portion is opened. With this construction adopted, it is feasible to downsize the apparatus, easily replace the toner cartridge and easily treat the jam of the recording mediums, thereby enhancing its usability.

Provided further are the side cover for covering one side surface of the apparatus body, the control portion provided along inside of the side cover and including the control circuit for controlling the whole apparatus, the opening portion formed in the portion, facing to the electric control portion, of the side cover, and the cover member, so provided that the cover member can be attached and detached or opened and closed with respect to the side cover, for closing the opening portion. With this construction adopted, the components of the control portion can be readily replaced and extended.

Next, a second embodiment of the present invention will be discussed referring to FIGS. 7 to 10. The facsimile apparatus is, however, exemplified as the image forming apparatus.

Figure 7:
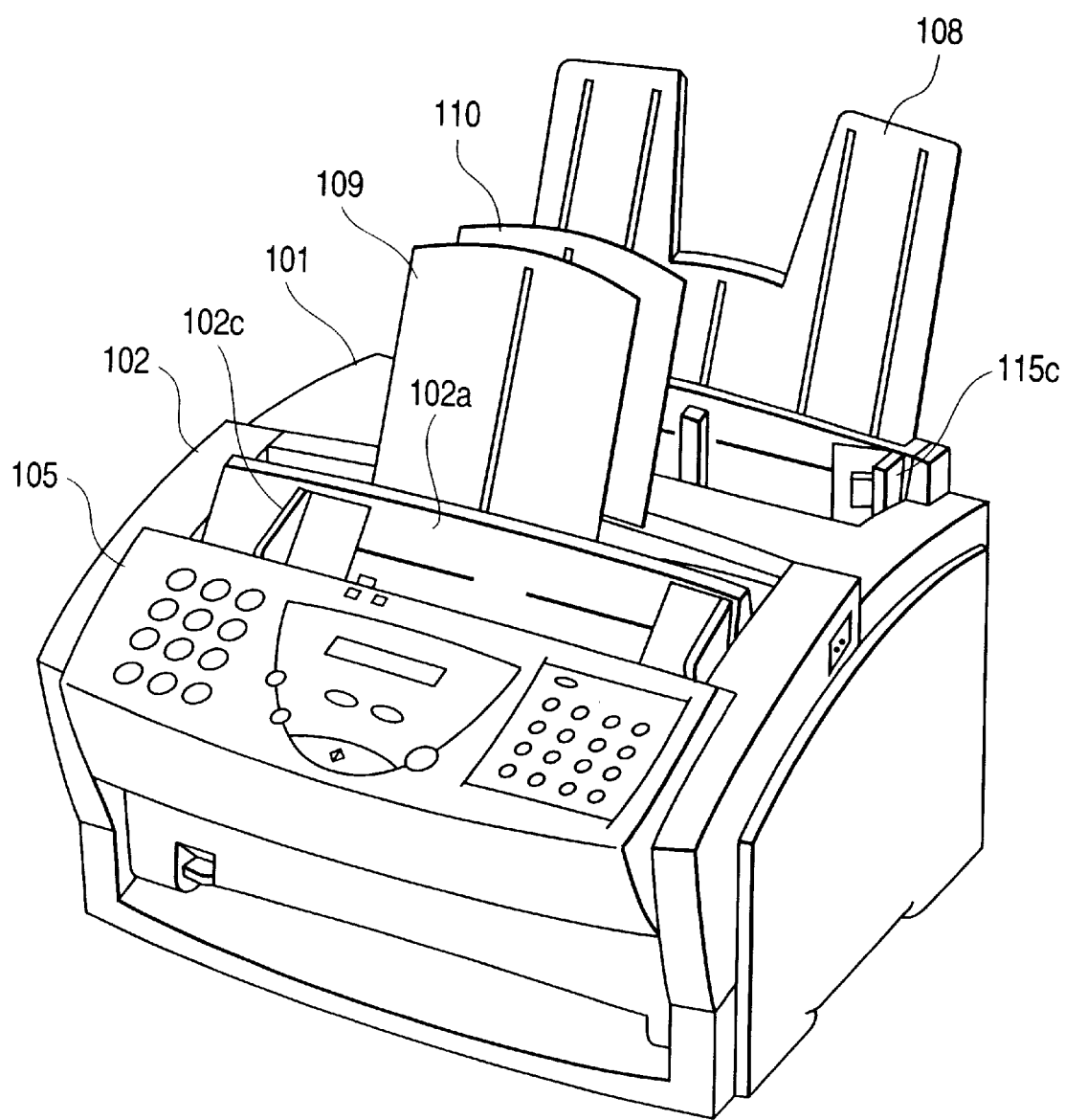
FIG. 7 is a perspective view showing an external appearance of the whole facsimile apparatus in a second embodiment of the present invention.
Figure 8:
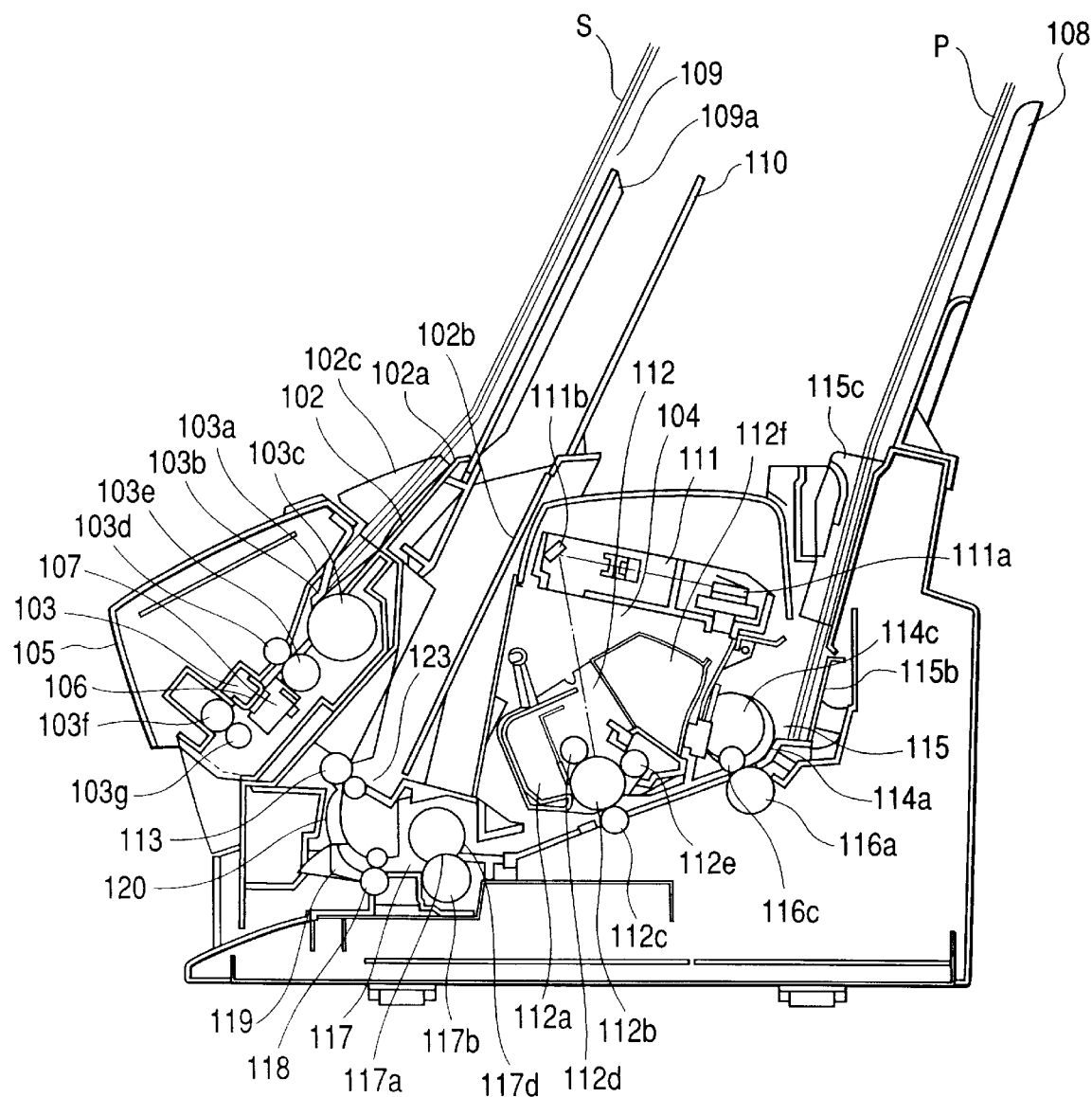
FIG. 8 is a sectional view showing the whole apparatus shown in FIG. 7.
Figure 9:
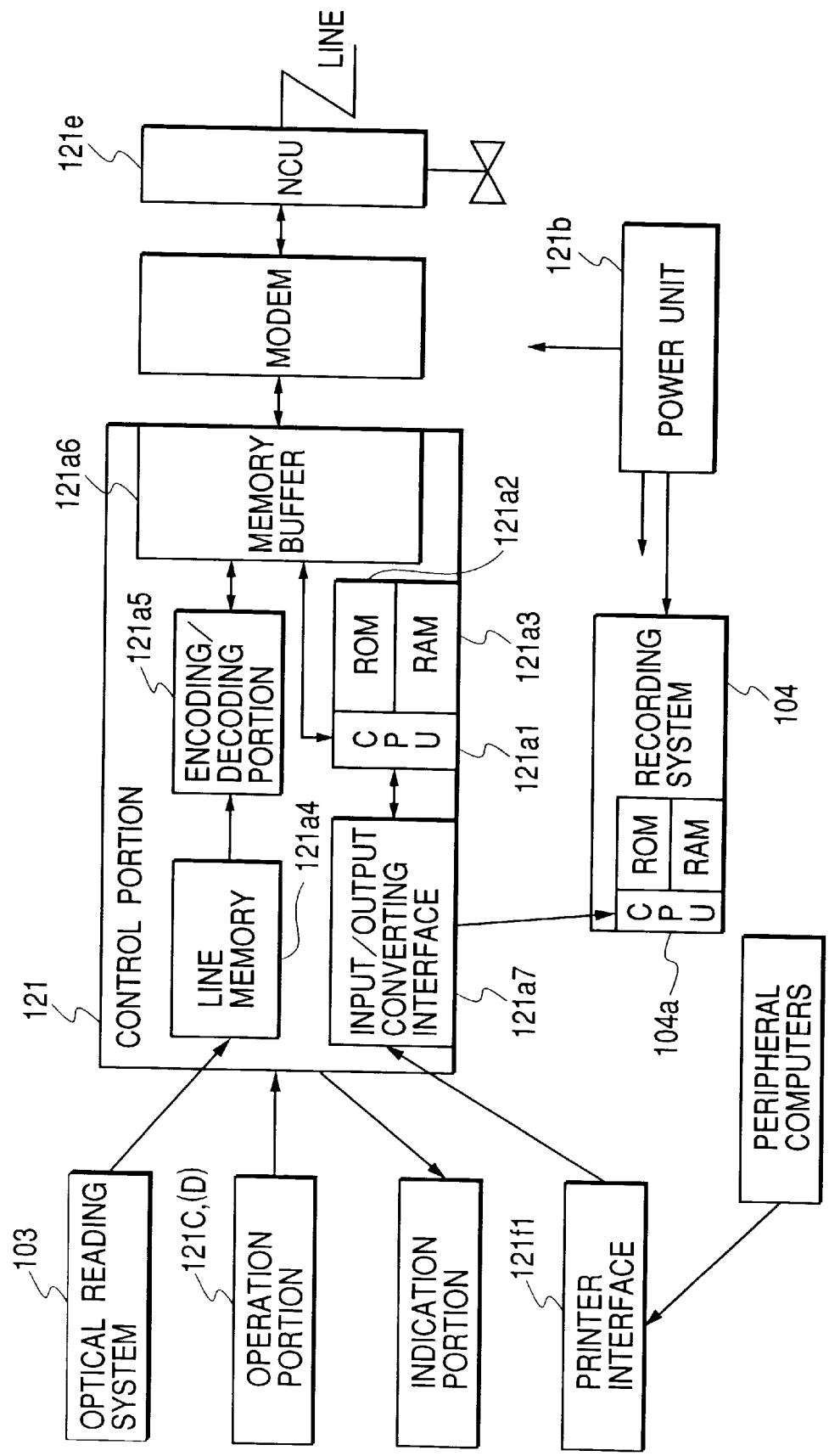
FIG. 9 is a block diagram of the control system of the apparatus shown in FIG. 7.
Figure 10:
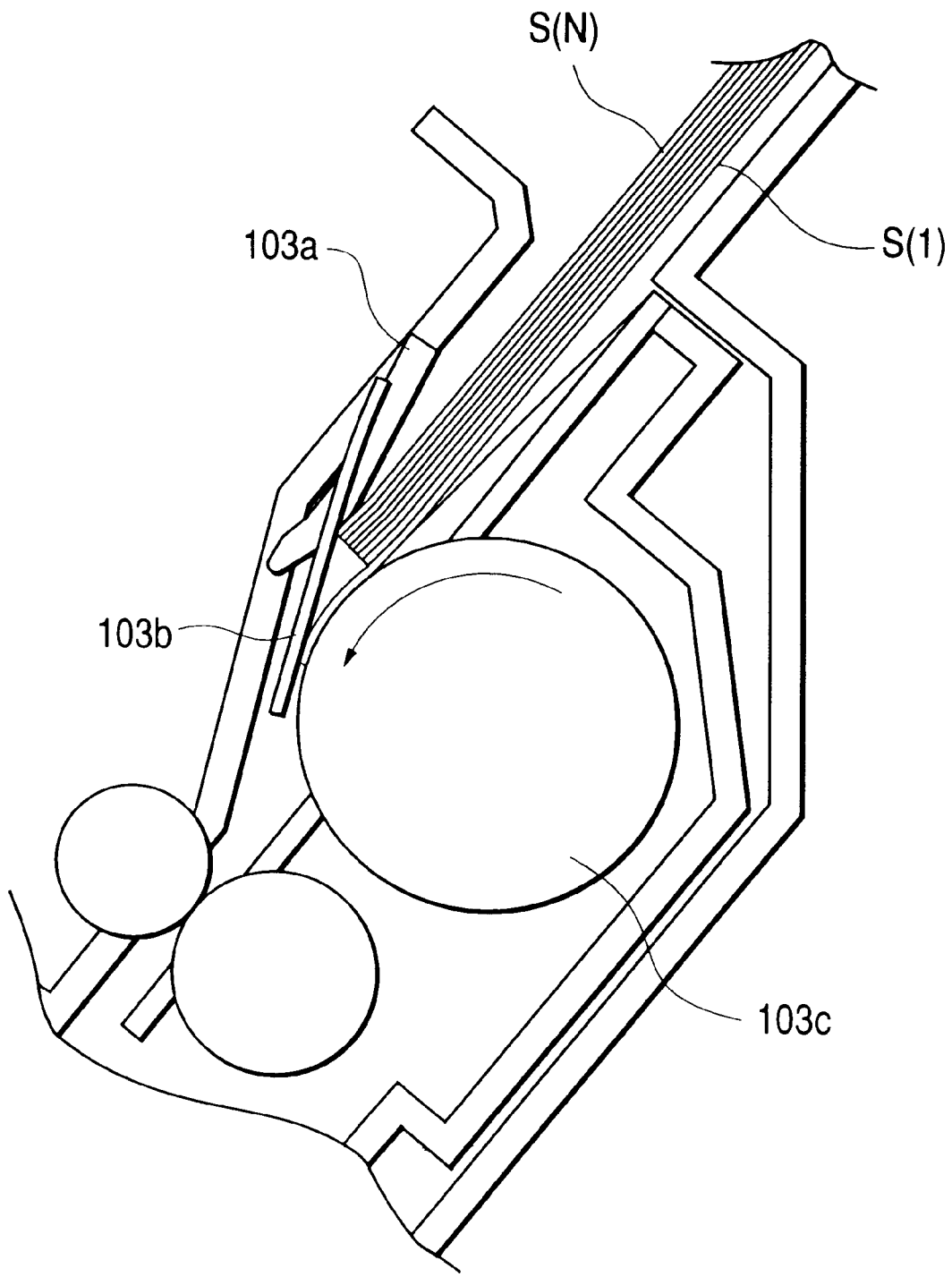
FIG. 10 is a view showing in details an original sheet separating portion of the apparatus shown in FIG. 8.

FIG. 7 is a sectional view showing a whole construction of the image forming apparatus in the second embodiment of the present invention. FIG. 8 is a sectional view showing the whole of the image forming apparatus. FIG. 9 is an explanatory block diagram showing a control process of the record. FIG. 10 is a diagram showing in details a separation portion for separating the original sheet.

To start with, the entire configuration of the image forming apparatus in the second embodiment of the present invention and an outline of a sheet carry device provided in this apparatus, will be explained with reference to FIGS. 7 and 8. An apparatus body 101 is provided with an optical reading system 103 for reading an image on the original sheet S and a recording system 104 constructed of a laser beam printer.

A cartridge cover 102 is provided extending from an upper portion of the apparatus body 101 to its front surface in such a way that the cover 102 can be opened and closed. A record cartridge, which will be mentioned later on, can be replaced by opening and closing the cartridge cover 102, and an operation panel 105 for operating the apparatus body 101 is also provided. The cartridge cover 102 is equipped with an unillustrated interlock switch which is turned ON/OFF interlocking with the opening/closing of the cartridge cover 102, and the recording system 104 is structured so as not to operate when the cartridge cover 102 remains open. Further, if the jam of the record sheets P occurs during the recording process, the record sheets P remaining inside can be taken out by opening the cartridge cover 102.

Further, the upper portion of the apparatus body 101 is provided with a sheet feeding tray 108, an original sheet tray 109 defined as a pre-reading sheet stacking member, and a sheet discharge tray 110 defined as a post-recording sheet stacking member, of which each is composed of a mold material. The sheet discharge tray 110 is provided adjacently behind the original sheet tray 109. A basic wall thickness of the original sheet tray 109 is 2.5 mm, and three pieces of ribs 109a each having a height of 4.5 mm and defined as spacing members are formed on the rear surface of the original sheet tray 109 integrally with the original sheet tray 109.

In the optical reading system 103, an original sheet placing board 102a provided integrally with the cartridge cover 102 has a continuity from the original sheet tray 109, and the original sheet S is placed astride of these members. Further, the original sheet placing board 102a is provided with a slider 102c slidable in a direction (a widthwise direction of the original sheet S) orthogonal to the carrying direction of the original sheet S, whereby both edges of the original sheets S placed on the original sheet tray 109 as well as on the original sheet placing board 102a can be adjusted uniformly by the slider 102c.

The original sheets S placed thereon start being carried while being caught by a preparatory press-contact arm 103 and a separation roller 103c, and further fed in separation sheet by sheet by a friction piece 103b and the separation roller 103c. The separately fed record sheets P are carried by a carry roller 103e and a carry roller 103d biased by the roller 103e. The record sheet P, the image information of which is read by a close-fitted type image sensor 107 defined as an original sheet reading element with the aid of an original sheet pressing portion 106 for pressing the original sheet against the sensor 107, is thereafter discharged outside the apparatus by a discharge roller 103g and a discharge roller 103f biased by this roller 103g.

In the recording system 104, a sheet feeding device 115 is provided at a rear portion of the apparatus body 101 in continuation from the sheet feeding tray 108. The sheet feeding device 115 includes a side adjusting plate 115c movably fitted corresponding to a size of the record sheet P, and the side adjusting plate 115c is constructed so that the side edges of the record sheet P are adjusted so as not to cause a skew in feeding. Sizes of the record sheets P stocked in the sheet feeding device 115 are three sizes such as an A4-size, a letter size and a legal size, and the number of the record sheets P that can be stocked therein is approximately 100.

The sheet feeding device 115, upon receiving a record sheet feed signal, presses the record sheets P by a middle plate 115b and brings the sheets P into a press-contact with the sheet separation roller 114c. Then, when the sheet separation roller 114c is rotationally driven, the sheets P are separated sheet by sheet by friction piece separating action of the sheet separation roller 114c and a separation pad 114a, and carried to a record cartridge 112 by a carry roller 116a and a press-contact roller 116c biased by this roller 116a.

The separately fed record sheets P are sent to the record cartridge 112 defined as an image recording device. The record cartridge 112 integrally incorporates a photosensitive drum 112b, a primary charging roller 112d, a developing roller 112e, a toner tank 112f and a cleaning device 112a. Further, the record cartridge 112 is so constructed as to be attachable to and detachable from the apparatus body 101 as well as being replaceable by opening the cartridge cover 102.

When recording the image, a modulation beam is emitted from an unillustrated laser beam generator of a laser scanner unit 111 on the basis of the image signal outputted from the unillustrated control portion, and the surface of the photosensitive drum 112b of the record cartridge 112 is irradiated with the modulation beam through a polygon mirror 111a and a deflection mirror 111b. Note that the laser scanner unit 111 is provided with an unillustrated laser shutter opened and closed interlocking with the opening/closing of the cartridge cover 102, thereby preventing the laser beam from striking upon eyes of the user when the cartridge cover 102 is opened.

The surface of the photosensitive drum 112b is uniformly charged by the primary charging roller 112d and irradiated by the modulation beam by scanning, thereby forming a latent image on the surface of the photosensitive drum 112b. The latent image is supplied with the toners through the developing roller 112e from the toner tank 112f, whereby the toner image becomes visible on the surface of the photosensitive drum 112b. A transfer roller 112c is so disposed as be press-contact with the photosensitive roller 112c, and the toner image on the photosensitive drum 112b is transferred onto the record sheet P by applying a predetermined electric potential.

Herein, an unillustrated resist sensor is provided downstream of the carry roller 116a, a front edge of the record sheet P is detected by this sensor. In combination with this detection, the laser scanner unit 111 controls a timing of outputting the image so that the front edge of the toner image formed on the photosensitive drum 112b coincides with the front edge of the record sheet P.

The record sheet P, onto which the image has been transferred, is carried to a thermal fixing portion 117. The thermal fixing portion 117 is constructed of a heater 117a classified as a exothermic body, a pressurizing roller 117b pressed against the heater, and a film 117d rotating along the outer periphery of a cylindrical guide. The toner image transferred onto the record sheet P is fused when receiving the heat and a pressure from the thermal fixing portion 117. The record sheet, to which the image has been fixed, is discharged from a discharge port 123 by a pair of discharge rollers 118, a guide portion 120 and a pair of discharge rollers 113, and stacked on a record sheet discharge board 102b and in a sheet discharge tray 110 with their image surfaces directed downward (face-down).

Further, a flapper 119 for switching the discharge direction of the record sheet P is provided downstream of the pair of discharge rollers 118. The direction of the flapper 119 is changed in a downward discharge direction, whereby the record sheet P can be discharged with its image surface directed upward (face-up) toward the front surface by the pair of discharge rollers 118.

Next, a control system of the image forming apparatus in the second embodiment of the present invention will be explained referring to a block diagram shown in FIG. 9.

Connected, as shown in FIG. 9, to a control portion 121 of the present apparatus are a power unit 121b for supplying the whole apparatus with the electric power, a MODEM circuit board unit, an NCU circuit board unit 121e to which a telephone is connected, an indication portion for indicating contents inputted from an operation portion 121c, and a printer interface 121f for obtaining data from peripheral computers.

Further, the control portion 121 includes a CPU 121a1 for controlling the whole of the present apparatus, a ROM 121a2 stored with a variety of programs and a variety of data, a RAM 121a3 used as a work area for the CPU 121a1 and temporarily stored with the variety of data about the number of records, and an I/O switching interface 121a7 for effecting a switch-over of the facsimile and the printer.

A line memory 121a4 for storing an image on each line of the image data, is stored with the image data for one line which is given from the optical reading system 103 in the case of transmitting the original sheet or copying, and stored with the decoded data for one line in the case of receiving the image data. Then, the image data stored in the line memory 121a4 is transmitted through the CPU 121a1 in which a recording system control code is added thereto, and is outputted to the CPU 104a provided in the recording system from the I/O switching interface 121a7. Then, the CPU 104a decodes the recording system control code, thereby recording the image.

Further, an encoding/decoding portion 121a5 incorporates a function of converting the image information to be transmitted into the image data by encoding the image information as in the case of MH encoding and decoding the encoded image data received. The code or the image data to be transmitted and received are temporarily stored in a buffer memory 121a6.

Next, the control of an image recording function will be explained. To start with, the data and the recording system control code transmitted from the peripheral computer are taken into the control portion 121 via a printer interface 121f1. Then, the data and the recording system control code are outputted from the I/O switching interface 121a7 to the CPU 104a provided in the control system 104, and the CPU 104a decodes the recording system control code, thereby recording the image. At this time, the CPU 121a1 incorporated into the control portion 121 is constructed so as not to control the image record. With this construction, the switching of the facsimile and the printer is simplified.

Given next is an explanation of detailed movements of the original sheet and the record sheet P in the case of simultaneously executing the reading and recording operations as in the case of performing a direct copy in which the original sheet is transmitted during a print-out process of the image received from the memory or set in the sheet tray 109, and the recording operation is executed during the reading process of the original sheet.

The plurality of original sheets S set in the sheet tray 109 with the reading surfaces directed downward, are separately fed sheet by sheet by the separation roller 103c and the friction piece 103b brought into the press-contact with this roller 103c, then carried by the carry roller 103c and the carry roller 103d, and discharged outside the apparatus by the discharge roller 103g and the discharge roller 103g. Then, the original sheet S is irradiated with the light beam by the close-fitted type image sensor 107 of the optical reading system 103 during the carry process of the original sheet S, and the image information is read by converting the reflected light beam into an electric signal.

Details of the operation of separating the original sheets S sheet by sheet by, as in FIG. 10, the separation roller 103c and the friction piece 103b brought into the press-contact with this roller 103c, will be described. The original sheet S(1) located lowest among the original sheets S stacked on the original sheet placing board 102a and in the original sheet tray 109 impinges upon the separation roller 103c, while the N-th original sheet S(N) impinges upon the friction piece 103b, and other original sheets are sandwitched in between these sheets. When the separation roller 103c rotates in an arrow-direction in such a state, the N-th original sheet S(N) is hindered in its movement and can not be carried by a friction against the friction piece 103b, and the original sheets from the second original sheet S(2) down to the (N−1)th original sheet S(N−1) are hindered in their movements and can not be carried, while only the first original sheet S(1) impinging on the separation roller 103c can be carried. The first original sheet S(1) is carried while being frictional to the second original sheet S(2) and therefore assumes static electricity, and the static electricity is also accumulated in a stack of sheets from the second sheet onwards.

When finishing the carry of the first original sheet S(1), the second original sheet is positioned lowest and impinges upon the separation roller 103c. Then, when the separation roller 103c again rotates in the arrow-direction, only the second original sheet is carried. Thereafter, the same operation as the above-mentioned is executed till the original sheets S stacked disappear, and the static electricity is accumulated in the stack of sheets not yet carried.

On the other hand, when feeding the record sheets P set in the sheet feed tray 108 to the recording system 104, the sheet separation roller 114c rotates in the feeding direction (in the clockwise direction in FIG. 8), and the record sheets P are separated sheet by sheet at a nip portion between the sheet separation roller 114c and the separation pad 114a kept in the press-contact therewith, thus feeding the record sheets P.

The single record sheet P separated and fed from the sheet feeding device 115 is led to a nip portion between a carry roller 116a and a press-contact roller 116c, and is fed while being caught on. The record sheet P is then sent to a nip portion between the photosensitive drum 112b and the transfer roller 112c.

The photosensitive drum 112b is driven by a gear integrally fitted thereto and rotates in the carrying direction (in the clockwise direction in FIG. 8). Further, a gear is also integrally fitted to the transfer roller 112c and meshes with the gear of the photosensitive drum 112b, whereby the transfer roller 112c is driven and thus rotates in the counterclockwise direction in FIG. 8. The toner image is transferred by the process described above onto the surface of the record sheet P fed to the nip portion between the photosensitive drum 112b and the transfer roller 112c.

The record sheet P with the toner image transferred thereto is carried to the thermal fixing portion 117. The pressurizing roller 117b rotates in the counterclockwise direction in FIG. 8, and the heater 117a is disposed in a position facing to the pressurizing roller 117b. The film 117d is attached to the outer periphery of the heater 117a so that the film 117d can be driven by the pressurizing roller 117b. The record sheet P carried to the thermal fixing portion 117 is led to a nip portion between the pressurizing roller 117b and the film 117d, and an image surface side of the sheet P is heated up, thereby fixing the toner image formed on the record sheet P.

The image-fixed record sheet P is led to a nip portion between the pair of discharge rollers 118, and the discharge direction of the record sheet P is changed over to a straight direction or a U-turn direction depending on the direction of the flapper 119. When the flapper 119 is in the position shown in FIG. 8, the record sheets P are U-turned via a guide portion 120, then carried to the pair of discharge rollers 113 and discharged from a discharge port 123. The discharged record sheets P are stacked on the record sheet discharge board 102b and on the sheet discharge tray 110.

Thus, the static electricity is, as described above, accumulated in the record sheets P upon causing the friction between the recording sheets when the sheet feeding device 115 separates and feed the record sheets P sheet by sheet from the uppermost sheet and also in the process of forming the image on the record sheet as well as coming into contact with the film 117d in the process of fixing the image.

The front edge of the already-recorded sheet P discharged to the record sheet discharge board 102b attracts toward the original sheet S by dint of the static electricity accumulated in the stack of the original sheets S stacked in the original sheet tray 109 before being carried. The record sheet P is, however, unable to approach the original sheet S due to the ribs 109a formed on the rear surface of the original sheet tray 109, and therefore the attracting force generated by the static electricity accumulated on the original sheets S as well as on the record sheets P, can be largely reduced. Further, the attracted record sheet P comes into contact with the ribs 109a, and hence an area brought into contact with the original sheet tray 109 decreases, thereby largely relieving the static electricity generated. With these contrivances, the record sheet P can be prevented from being adsorbed to the rear surface of the original sheet tray 109.

Moreover, when the rear edge of the record sheet P is discharged from the discharge port 123, the record sheet P is stacked by a self-weight thereof on the sheet discharge tray 110. It is therefore feasible to prevent the jam from being caused without hindering the discharge route of the record sheet discharged thereafter, and to largely enhance the reliability as a product.

Note that the explanation is given based on the assumption that the basic wall thickness of the original sheet tray 109 is set to 2.5 mm, and the height of the rib serving as a spacing member is set to 4.5 mm (which is approximately 1.8 times the basic wall thickness) in the second embodiment, however, the present invention is not limited to these numerical values. According to tests, it proved that although the jam does not occur in a case where the height of the rib is as small as 1.5 mm for, and the effects of the present invention can be obtained when the height of the rib is approximately 3 mm (which is approximately 1.5 times the basic wall thickness).

Herein, the reason why the effect becomes larger with the higher rib is that the attracting force produced by the electric charges is in inverse proportion to a square of the distance, and the effect of the present invention can be obtained if a thickness of a sum of the basic wall thickness of the original sheet tray and the height of the rib is over a predetermined numerical value.

Next, a first modified example of the second embodiment of the present invention will be explained referring to FIG. 11.

In the second embodiment of the present invention, the original sheet tray 109 is constructed such that the ribs 109a are formed on the rear surface composed of a plate-like mold material, however, the original sheet tray may also be constructed of only the ribs for making the original sheets S stacked and the already-recorded sheets P spaced at some distance.

Figure 11:
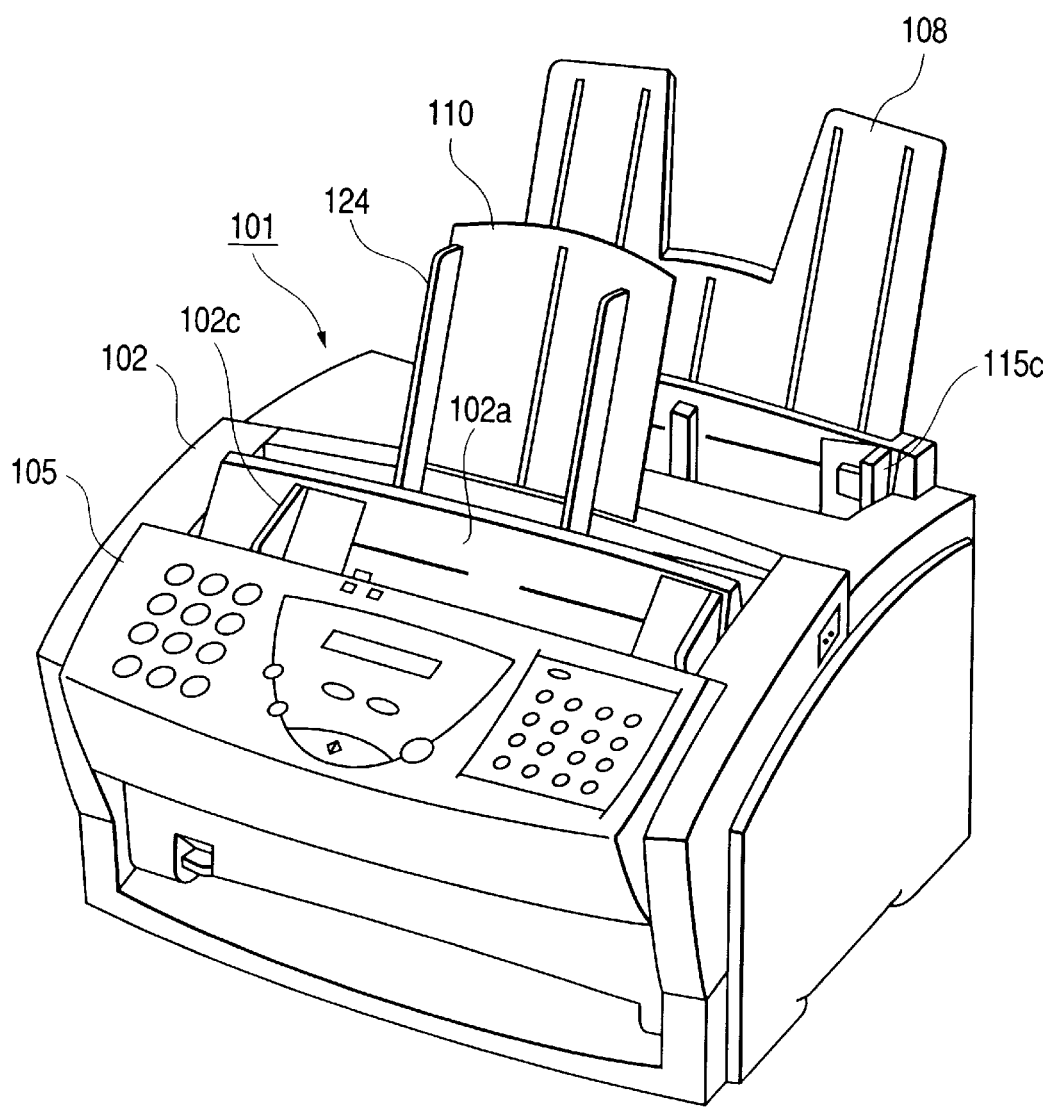
FIG. 11 is a perspective view showing a first modified example of the apparatus shown in FIG. 8.

As illustrated in FIG. 11, in the image forming apparatus in the first modified example of the second embodiment of the present invention, an original sheet tray 124 constructed of only the ribs is provided on the original sheet placing board 102a of the cartridge cover 102. The movement of the original sheets S and the record sheets P in the present apparatus are the same as those in the first embodiment. There is, however, no sense of oppression and given a clear-cut impression to the user when the original sheet tray 124 is constructed of only the ribs as compared with disposing the two trays adjacent to each other on the front surface of the apparatus body 101.

Note that the original sheet tray 124 is constructed of the two ribs in the examples given above and may also be constructed of three or more ribs.

Figure 12:
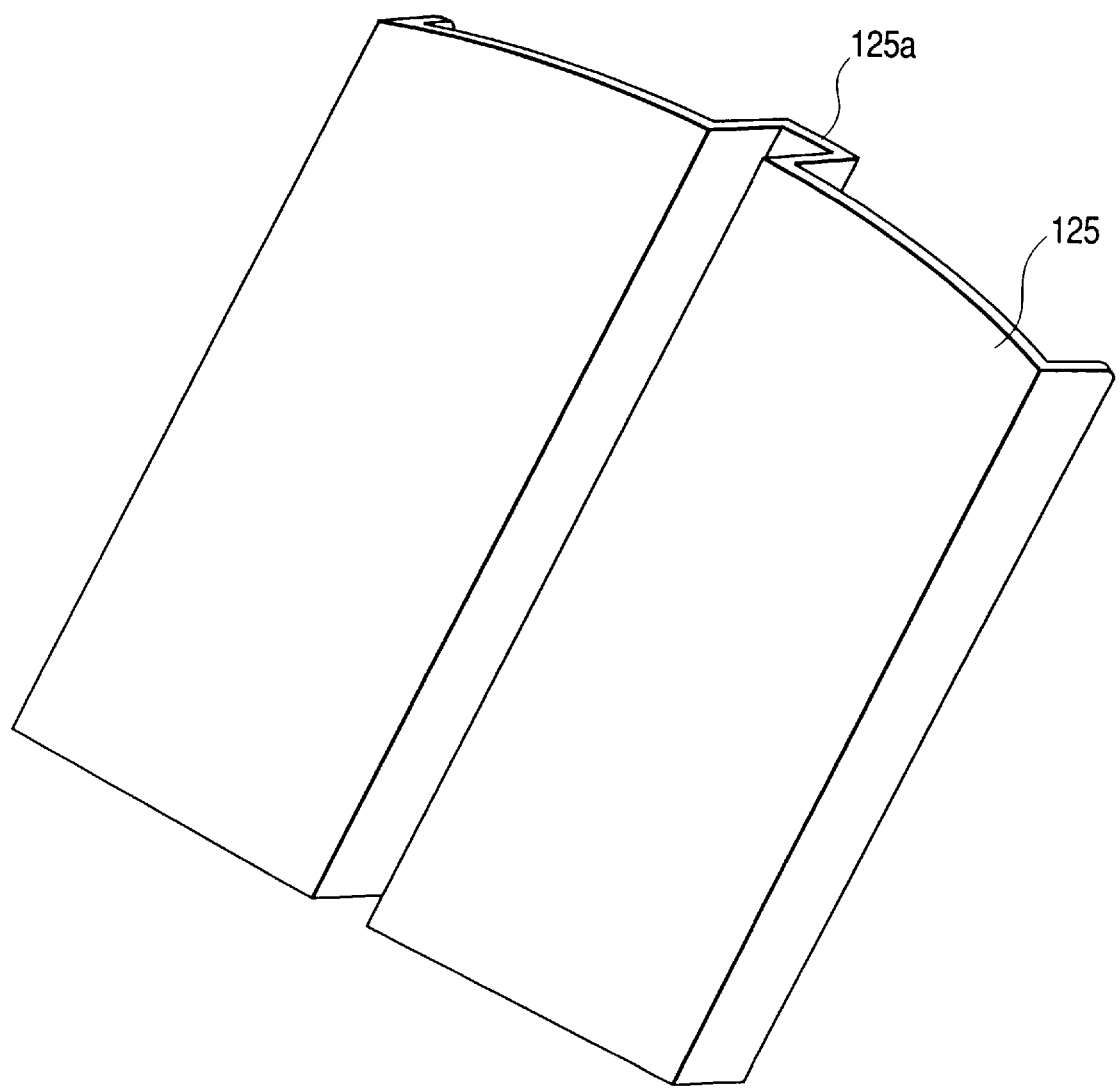
FIG. 12 is an enlarged view of an original sheet tray, showing a second modified example of the apparatus shown in FIG. 8.

Next, a second modified example of the second embodiment of the present invention is explained referring to FIG. 12.

In the second embodiment of the present invention and in the first modified example thereof, the construction is that the ribs are used for making the original sheets stacked and the already-recorded sheets P spaced from each other, however, the present invention can be similarly carried out even by forming stepwise the plate member of the original sheet tray.

As in the same way with the first modified example of the second embodiment of the present invention, an original sheet tray 125 shown in FIG. 12 is composed of the mold material, and a stepped portion 125a extending in the moving direction of the original sheet S is formed substantially at its central portion. With this configuration, the record sheet P can be prevented from being adsorbed to the rear surface of the original sheet tray 125 as in the second embodiment and in the first modified example thereof, and the jam can be also prevented from being caused when discharging the record sheets P.

Note that in the sheet carrying device in the second embodiment of the present invention and in the first and second modified examples thereof, the original sheet tray defined as a pre-reading sheet stacking member and the sheet discharge tray defined as a post-recording sheet stacking member are disposed back and forth adjacently. The effect produced by applying the present invention can be also obtained in the sheet carrying device or the image processing apparatus in which these trays are disposed while being rated through 90°, i.e., the pre-reading sheet stacking member and the post-recording sheet stacking member are disposed up and down adjacently.

As discussed above, in the image forming apparatus in the second embodiment of the present invention and in the first and second modified examples thereof, the spacing member such as the ribs is provided in rear of the stacking device located in front of the pre-reading sheet stacking member and the post-recording stacking member disposed adjacent to each other, whereby a predetermined spacing can be given between the sheet discharged to the rear-side stacking member and the sheet stacked on the front-side stacking member. Accordingly, even if the sheet discharged assumes the static electricity of an inverse voltage with respect to the sheet stacked, it never happens that these sheets get closer to each other than the spacing ensured by the spacing members, and the attracting force caused by the static electricity can be largely decreased. Further, the spacing members serve to reduce the area with which the sheet discharged contacts the front-side stacking member, and the static electricity generated is largely relived. The sheet discharged can be thereby prevented from being adsorbing to the front-side stacking member.

Accordingly, it never happens that the sheet discharged afterward is hindered from its being discharged, the jam is prevented from its occurrence, whereby the reliability of the product can be greatly enhanced.

Next, a third embodiment of the present invention is described with reference to FIGS. 13 to 18. The facsimile apparatus will be exemplified as the image forming apparatus, and there is given an explanation of how the sheet material of the facsimile apparatus is fed.

Hereafter, as the explanatory sequence, to begin with, an outline of the construction of the facsimile apparatus serving as the image processing apparatus is described, and next a construction and an operation of an original sheet carrying portion serving as a sheet material feeding device to which the present invention is applied, will be explained.

Figure 13:
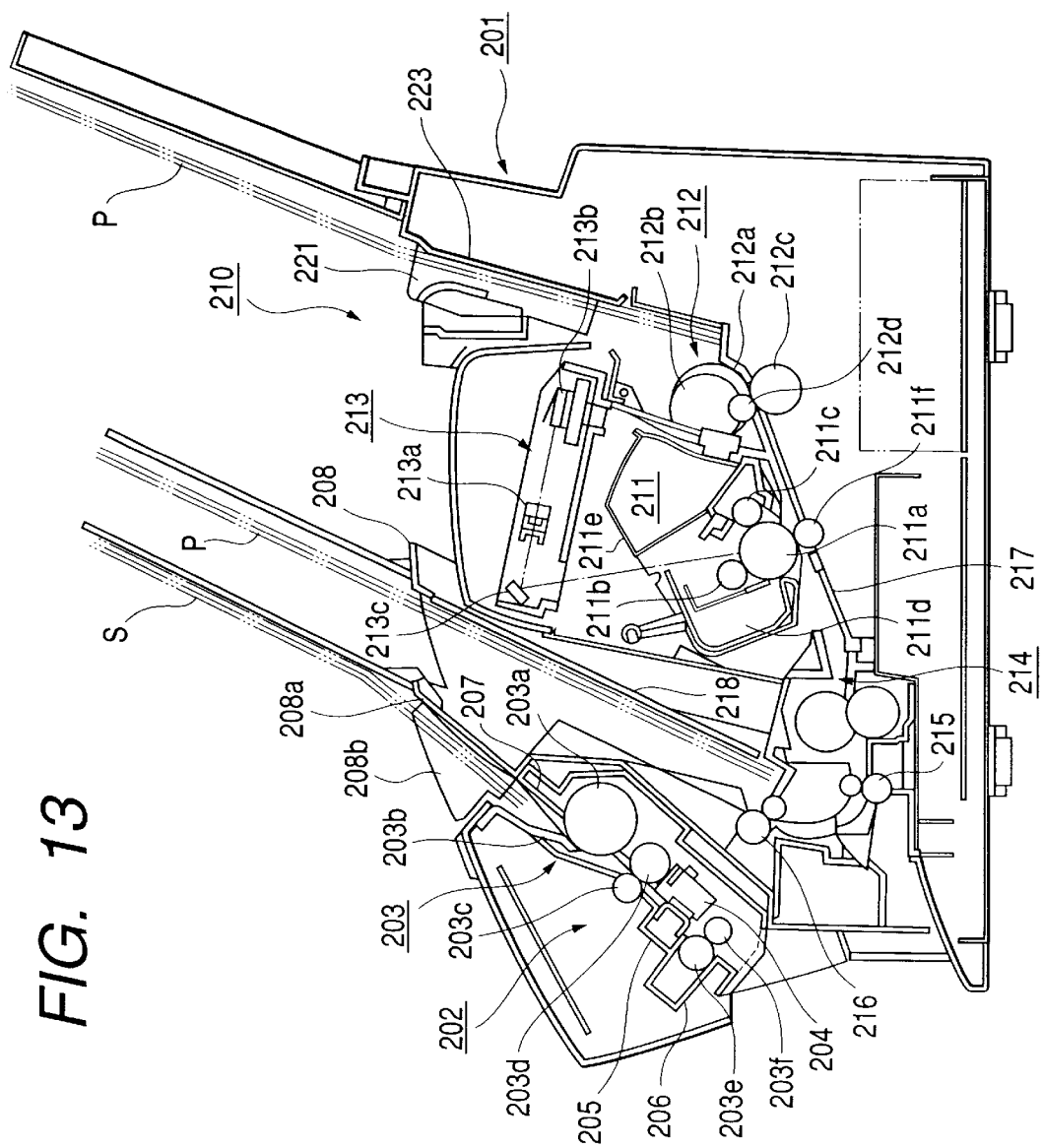
FIG. 13 is a sectional view illustrating a construction of the facsimile apparatus in a third embodiment of the present invention.
Figure 14:
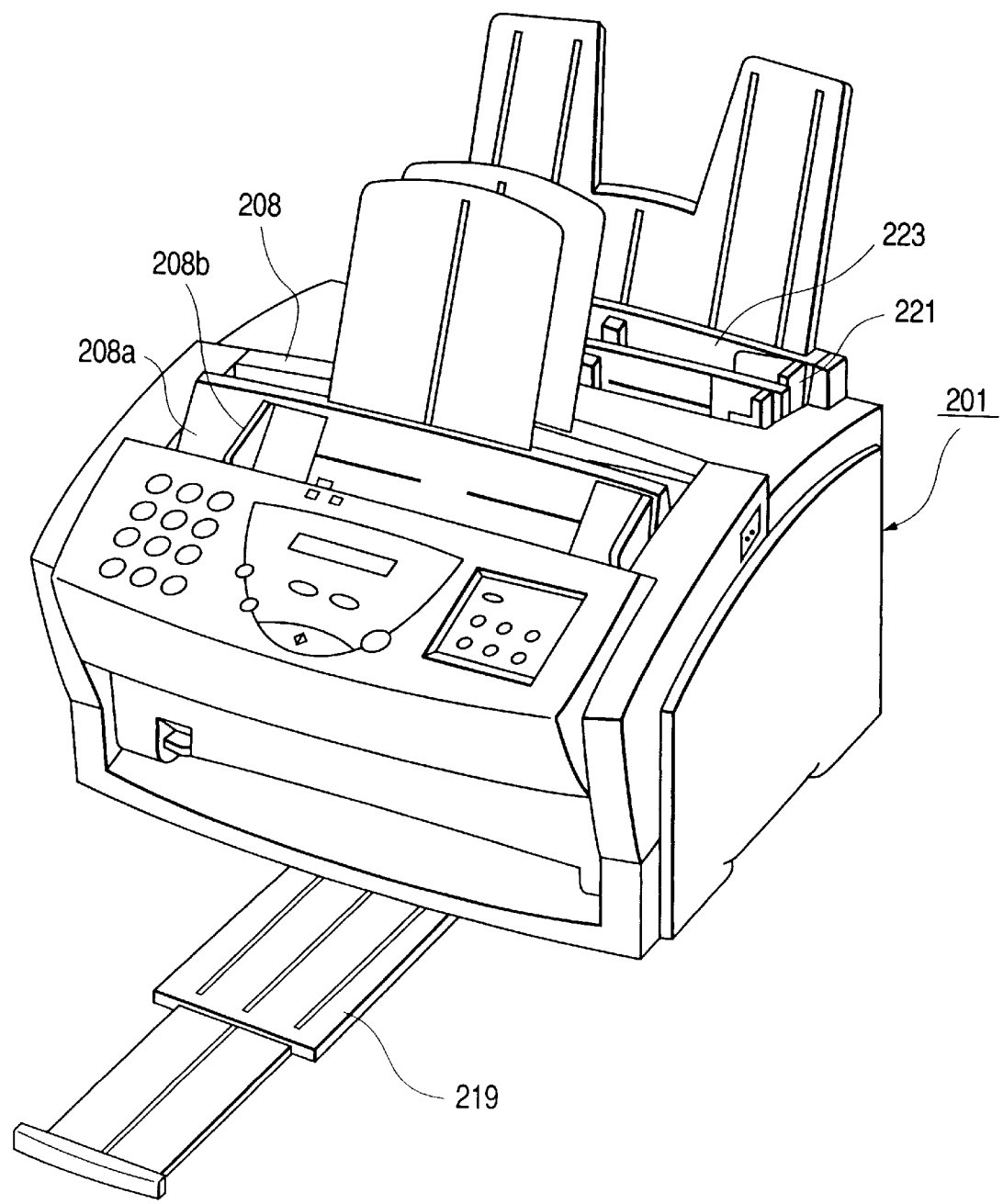
FIG. 14 is a perspective view showing an external appearance of the whole apparatus shown in FIG. 13.

To start with, the outline of the construction of the facsimile apparatus is described referring to FIGS. 13 and 14. FIG. 13 is a schematic sectional view showing the outline of the construction of the facsimile apparatus in the third embodiment. FIG. 14 is a perspective view showing an external appearance of the apparatus. Referring to FIGS. 13 and 14, an apparatus body 201 is constructed of an image reading portion 202 for reading the image on the original sheet conceived as a reading target, and an image recording portion 210 for recording the image on the record sheet P serving as a recording target.

The image reading portion 202 includes an upper cover having an original sheet placing board 208a on which the plurality of original sheets S can be placed, a close-fitted image sensor 204 serving as a reading device for reading the image on the original sheet S, an original sheet pressing member 205 for pressing the original sheet S against the close-fitted type image sensor 204, an original sheet carrying portion 203 for sequentially feeding the original sheets S sheet by sheet which are placed on the original sheet placing board 208a and carrying the sheet S through the close-fitted type image sensor 204, and upper and lower original sheet guides 206, 207 for forming a carry path for the original sheets S.

The upper cover 208 having the original sheet placing board 208a is so attached to the apparatus body 201 as to be capable of opening and closing to facilitate the replacement of the cartridge and the jam treatment which will be mentioned later on. Further, the original sheet placing board 208a is provided with a slider 208b slidable in the widthwise direction orthogonal to the carrying direction of the original sheet S, the slider 208b is capable of adjusting the both edges of the original sheets S placed on the original sheet placing board 208a.

Further, the close-fitted type image sensor 204 as the reading device irradiates the image information surface of the original sheet S with the light beams emitted from an LED array, and the reflected light beams (image light) from the image information surface are projected to form an image on a sensor element through a SELFOC lens (registered trademark), thereby reading the image information.

Note that the original carrying portion 203 serving as the sheet material feeding device to which the present invention is applied will be discussed in greater details.

The image recording portion 210 includes a record sheet stacking portion 223 for stacking the record sheets P defined as the recording target, a record sheet feeding portion 212 for sequentially feeding the record sheets P sheet by sheet from the record sheet stacking portion 223, an image forming portion for recording and forming the image on the fed record sheet P, a laser scanner 213 for irradiating the image forming portion 211 with the laser beams (image light) by way of the image information, a sharing discharge tray 219 (see FIG. 14) for stacking and holding the record sheets P discharged after finishing the record as well as the original sheets S discharged after finishing the reading process, a record sheet discharge board 218 for stacking and holding the record sheets P discharged in U-turn after the recording process, and a carry guide 217 for guiding and supporting the record sheets P to be carried.

In the record sheet feeding portion 212, upon a start of the feed, the record sheets P brought into the press-contact with a separation roller 212b are separated sheet by sheet by the separation roller 212b and a separation pad 212a coming into the press-contact with this roller 212b, and thereafter carried to between a photosensitive drum 211a and a transfer device 211f of the image forming portion 211 by a carry roller 212c and a carry roller 212d rotationally driven in the press-contact with this roller 212c while adjusting a timing so that the front edge of the image (toner image) formed by the image forming portion 211 coincides with the front edge of the record sheet P.

The record sheet stacking portion 223 is provided with a slider 221 slidable in the widthwise direction orthogonal to the carrying direction of the record sheet P, and the slider 221 is capable of adjusting the both edges of the record sheets P placed on the record sheet stacking portion 223. It is to be noted that the plurality of record sheets P can be stacked on the record sheet stacking portion 223, and the number of record sheets that can be set therein is approximately 100 in the third embodiment. Further, the sizes of the record sheets P that can be stacked are three sizes such as the A4-size, the letter size and the legal size. According to the present invention, however, the number of the record sheets that can be set and the sizes of the record sheets that can be stacked are not limited to those described above, and the number and the sizes of the record sheets may be properly set as the necessity arises.

In the image forming portion 211, to begin with, the laser beam defined as an image signal is emitted from a laser beam emitting device 213a of the laser scanner 213 on the basis of the image signal. The laser beam strikes upon the photosensitive drum 211a of the image forming portion 211 through a polygon mirror 213b and a deflection mirror 213c, thereby forming an image on the surface of the photosensitive drum 211a.

In the image forming portion 211, the photosensitive drum 211a is incorporated into a frame body together with a charging portion 211b serving as a process element acting on the drum 211a, a developing portion 211c and a cleaning portion 211d, thereby constituting a process cartridge 211e. The process cartridge 211e is so constructed that the cartridge 211e is attachable to and detachable from the apparatus body 201. Accordingly, when in the image forming process described above, a latent image is formed on the surface of the photosensitive drum 211a upon its being irradiated with the laser beams from the laser scanner 213, which surface is uniformly charged by the charging portion 211b. The latent image becomes visible (as a toner image) with the toners supplied from the developing portion 211c.

Further, in the image forming portion 211, a transferring portion 211f for transferring onto the record sheet P the toner image formed on the drum surface, is disposed in the peripheral portion to the photosensitive drum 211a. Moreover, a fixing portion 214 for fixing the transferred image onto the record sheet P is disposed on the record sheet carry path extending more downstream than the photosensitive drum 211a. Incidentally, the numerals 215, 216 designate a pair of discharge rollers.

Accordingly, the record sheet P fed synchronizing with the timing to the image forming portion 211 from the record sheet stacking portion 223 is, after being transferred with the toner image formed on the surface of the photosensitive drum 211a by the transferring portion 211f, carried to the fixing portion 214 along a carry guide 217. Then, the record sheet P, onto which the toner image has been fixed by the fixing portion 214, is discharged to the sharing discharge tray 219 by the pair of discharge rollers 215 or to the record sheet discharge board 218 by the pair of discharge rollers 216 through the U-turn path.

Note that if the sheet jam occurs during the recording process, the record sheets P remaining inside the apparatus can be easily taken out by opening the upper cover 208 having the original sheet placing board 208a.

Figure 15:
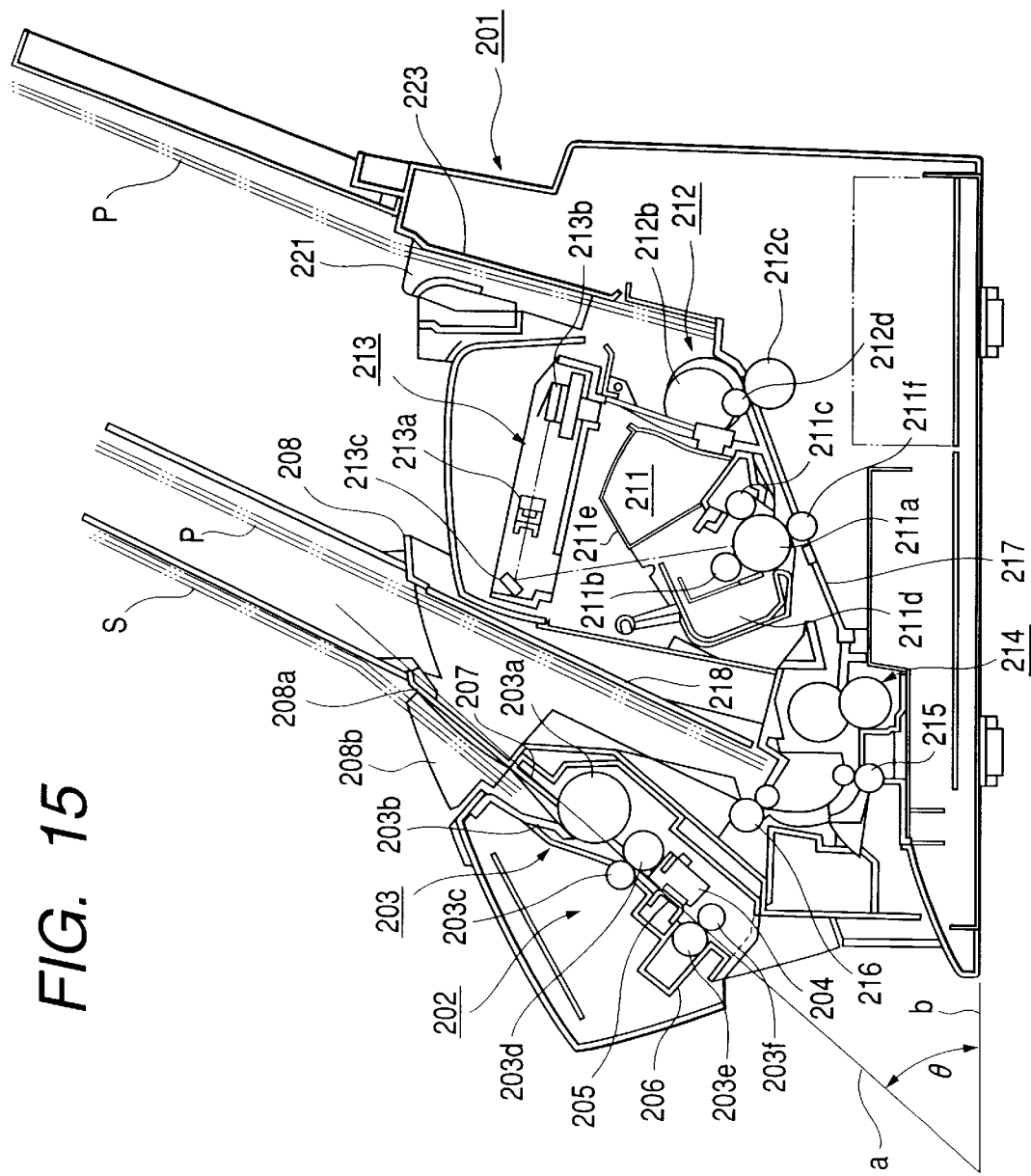
FIG. 15 is an explanatory sectional view showing how the original sheet is carried in the apparatus shown in FIG. 13.
Figure 16:
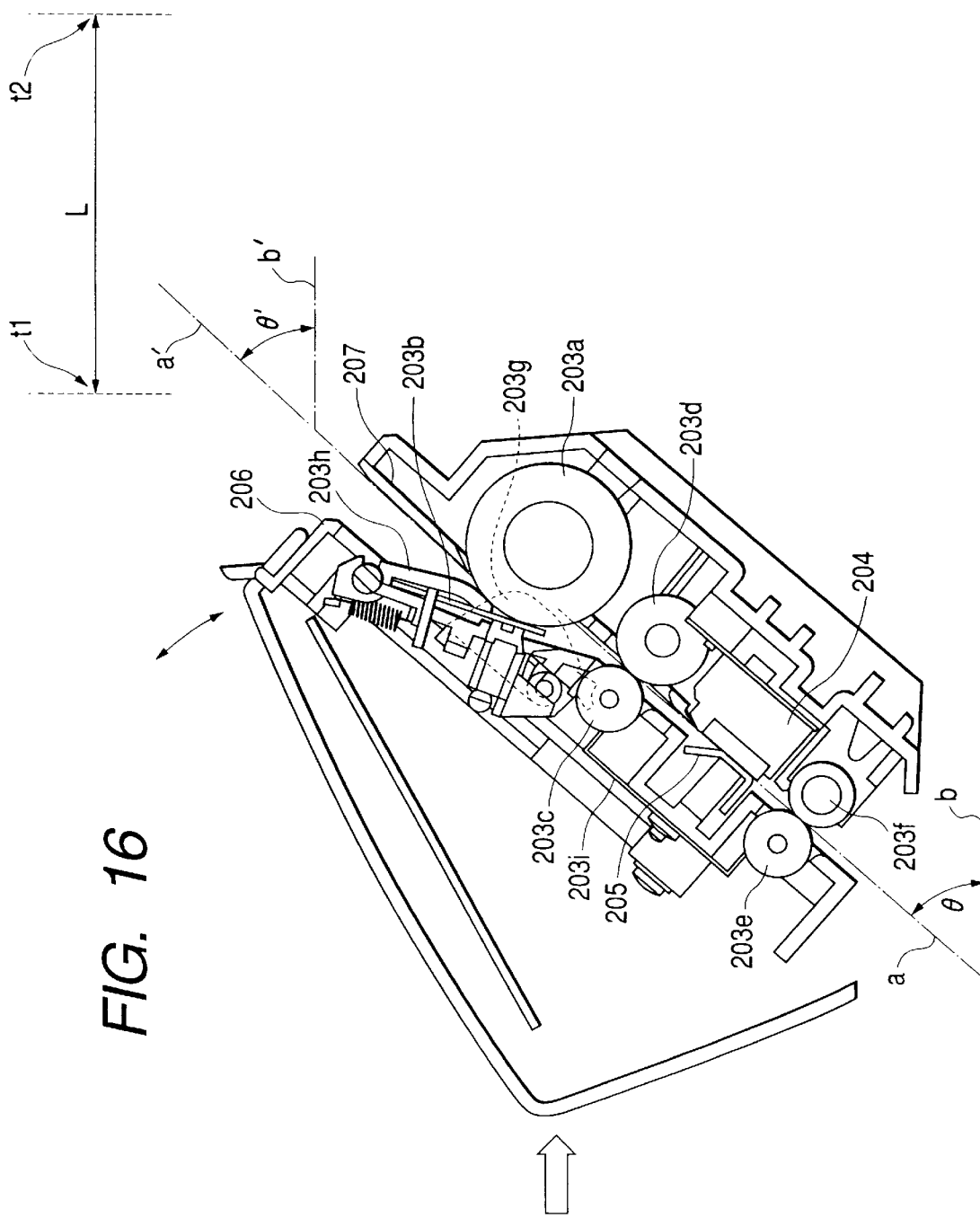
FIG. 16 is a sectional view illustrating an image reading portion of the apparatus shown in FIG. 15.
Figure 17:
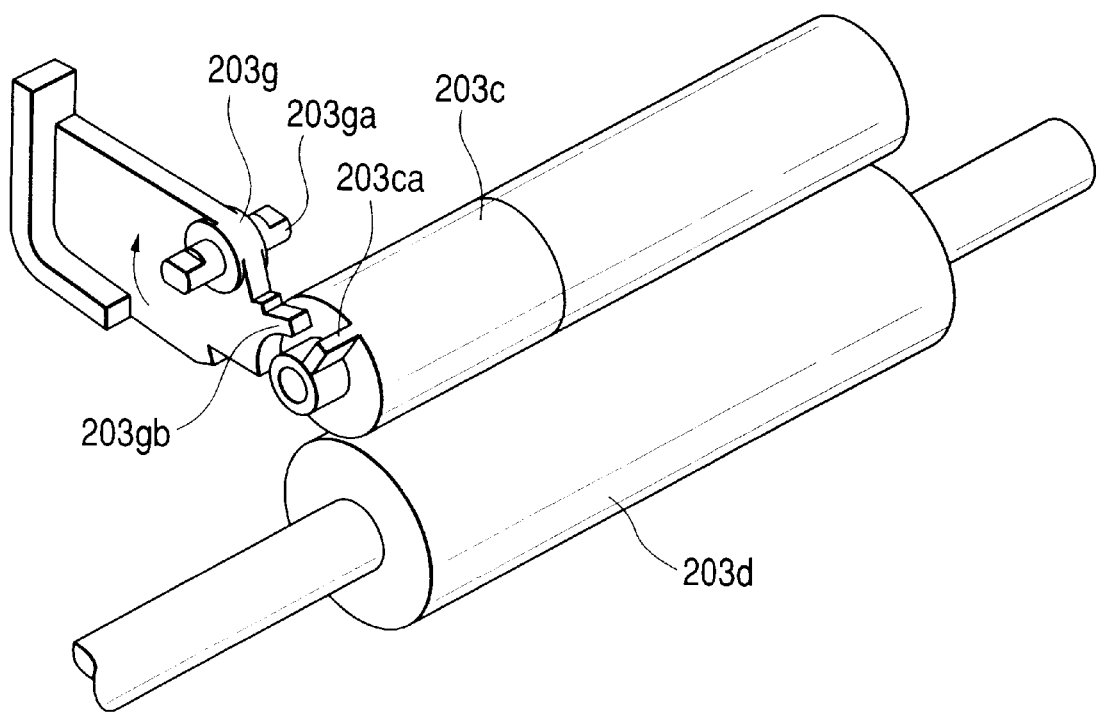
FIG. 17 is a perspective view showing a stopper portion of an original sheet carry portion shown in FIG. 16.
Figure 18:
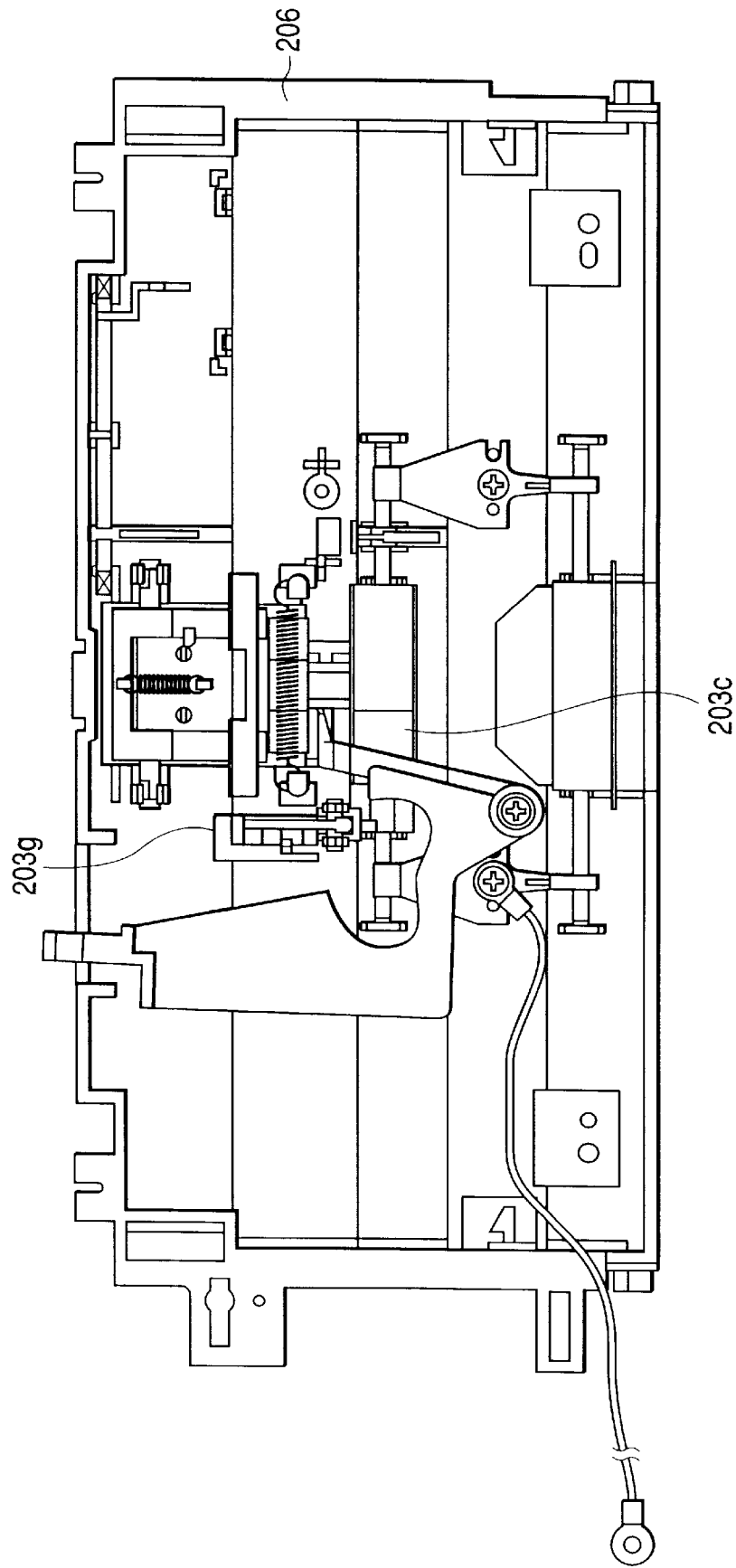
FIG. 18 is a top view of an upper original sheet guide unit of the apparatus shown in FIG. 16.

Next, a construction and an operation of the original sheet carrying portion to which the present invention is applied, will be described referring to FIGS. 15 to 18. FIG. 15 is a schematic sectional view showing the present facsimile apparatus. FIG. 16 is a diagram showing a configuration of the image reading portion equipped with the original sheet carrying portion. FIG. 17 is a diagram showing a construction of the principal portion of the original sheet carrying portion. FIG. 18 is a top view showing an upper original sheet guide unit.

Referring first to FIG. 16, the construction of the original sheet carrying portion 203 in the image reading portion 202 is explained based on a flow of the original sheets. As shown in FIG. 16, in the image reading portion 202, when the original sheets S are placed on the original placing board 208a (see FIG. 13), the front edge of the original sheet S is caught in between the separation roller 203a and a preparatory press-contact arm 203h coming into the press-contact with this roller 203a and impinges upon a stop surface of a stopper 203g, thus making the original sheet S unable to intrude farther. After the original sheets S have been thus set, the carry of the original sheet S is started, at which time the stopper 203g serving as a regulating member is opened by a sheet feed roller 203c with an opening source. Consequently, the original sheet S is sent to a friction piece 203b by the separation roller 203 and the preparatory press-contact arm 203h kept in press-contact with this roller 203a. Then, the original sheets S are separated sheet by sheet by the separation roller 203a and the friction piece 203b kept in press-contact with this roller 203a and thus fed. Incidentally, the stopper 203g serving as the regulating member will hereinafter be explained.

The original sheets separated singly as described above are further carried to the close-fitted image sensor 204 by the sheet feed roller 203a pressed by a pressing spring 203i and a sheet feed roller 203d kept in the press-contact with this roller 203c, and sequentially sent in line while being close-fitted to the close-fitted type image sensor 204 by an original sheet pressing member 205, during which the image information is read. Thereafter, the original sheets S are discharged to the sharing discharge tray 219 (see FIG. 14) by a sheet discharge roller 203e pressed by the pressing spring 203i and a sheet discharge roller 203g kept in the press-contact with this roller 203e. Meanwhile, the original sheets S are guided by the upper and lower original sheet guides 206, 207.

Note that the stopper 203g, the preparatory press-contact arm 203h, the friction piece 203b, the sheet feed roller 203c, the sheet discharge roller 203e, the pressing spring 203i and the original sheet pressing member 205 are provided on the side of the upper original sheet guide 206, while on the side of the lower original sheet guide 207 there are provided the separation roller 203a, the sheet feed roller 203d, the sheet discharge roller 203f and the close-fitted type image sensor 204. Then, the upper original sheet guide 206 side is capable of opening and closing in an arrow-direction in FIG. 16 with respect to the lower original sheet guide 207 side. Accordingly, if the sheet jam occurs, the carry path for the original sheets becomes open by opening the upper original sheet guide 206 side, whereby the jam treatment can be easily executed.

Herein, the regulating member for preventing the original sheet defined as a sheet material to be read from an excessive insertion, will be explained with reference to FIG. 17. Referring to FIG. 17, the stopper serving as the regulating member is designated by 203g, the symbol 203c represents the sheet feed roller with the opening source which is defined as a rotary member, and 203d denotes the sheet feed roller. The stopper 203g regulates the front edge of the original sheet set on the placing board 208a, and is constructed to release the regulation of the front edge of the original sheet with the aid of the sheet feed roller 203c with the opening source which rotationally driven when the sheet feed roller 203d rotates.

An outline of the operation of the stopper 203g is explained referring to FIGS. 17 and 18. First of all, the stopper 203g stands by in a regulation position (indicated by a broken line in FIG. 16) in which to regulate the front edge of the original sheet in an initial state, and, when setting the original sheets S on the original sheet placing board 208a, the front edges of the original sheets S impinge upon (a stop surface of) the stopper 203g, the original sheets S stand by in a fixed position. Next, upon a start of carrying the original sheets by pressing a start button, the sheet feed roller 203d rotates in the carrying direction of the original sheet, and the sheet feed roller 203 is thereby rotationally driven. Then, a protrusion 203ca of the sheet feed roller 203c impinges upon a protrusion 203gb of the stopper 203g, and, following up this operation, the stopper 203g rotates about a shaft 203fa serving as a fulcrum in the arrow-direction (FIG. 17) and retreats upward (a release of the regulation). Then, the original sheet S enters the separating portion. Subsequently, the original sheets S are singly separated the separation roller 203a and the friction piece 203h kept in the press-contact with this roller 203a, which constitute the separating portion. Then, the stopper 203g, when the last original sheet passes through, descends and returns to the regulating position. At this time, after finishing the reading process of the original sheets, the stopper can be surely returned to the regulating position by reversing the rotations of a motor for driving the sheet feed roller 203d etc. Thus, the excessive insertion of the original sheet can be prevented with the extremely simple construction.

Moreover, the original sheet carrying portion 203 is described in greater details with reference to FIGS. 15 and 16. This original sheet carrying portion 203 is, as illustrated in FIGS. 15 and 16, constructed such that the carry path for the original sheets S is formed substantially straight (as indicated by a line "a" in FIG. 16), and that an angle θ of the carry path for the original sheet S to the installing surface (indicated by a line "b" in FIG. 16) of the apparatus is 40° or larger. Incidentally, the construction in the third embodiment is made so that the angle θ becomes approximately 50°.

Moreover, the construction is that an angle θ' of the original sheet placing board (indicated by a line "a'" in the Figure) to the installing surface (indicated by the line "b'") of the apparatus is 40° or more, and the original sheet placing board 208a constitutes the carry path extending substantially straight in combination with the carry path for the original sheets. In accordance with the third embodiment, the angle θ' is approximately 50° equal to the above angle θ. With this contrivance, as shown in FIG. 16, a set position t1 of the original sheet is closer to the user by a distance L than a previous set position t2, and correspondingly the original sheet setting by the user is facilitated.

Moreover, if the angle becomes 40° or larger, the original sheets set on the placing board are excessively inserted into the separating portion by their weight. Especially when the number of original sheets set exceeds 15 sheets, there might be caused a separation defect such as a double-sheet feed due to the excessive insertion of the original sheets into the separating portion. According to the present construction, however, as explained above, there is provided the stopper for regulating the front edge of the original sheets placed on the placing board 208a and releasing the regulation thereof, and therefore the above defect can be prevented.

As discussed above, the carry path for the original sheets and the placing board 208a are formed substantially straight, whereby the original sheets (having a comparatively large thickness such as a name card and a thick sheet) can be smoothly fed. Further, there is provided the stopper for regulating the front edge of the original sheet placed on the placing board 208a and leasing the regulation thereof.

Besides, the angle θ of the carry path for the original sheet to the installing surface of the apparatus and the angle θ' of the placing board 208a to the installing surface of the apparatus are set to 40° or larger (approximately 50° in the third embodiment). With this setting, the user, when setting the original sheets on the placing board 208a, can simply set the sheets by putting the sheets down from above by utilizing the gravity. Hence, there is no necessity for setting the original sheets by intruding them, and consequently it never happens that the front edges of the original sheets do not reach the separating portion or the original sheets are excessively intruded into the apparatus. Accordingly, the setting characteristic of the original sheets can be enhanced while ensuring a separating performance of the original sheets. Further, the whole apparatus can be farther downsized.

Exemplified in the above-described third embodiment of the present invention is such an angle setting that the angle θ of the carry path for the original sheet to the installing surface of the apparatus and further the angle θ' of the placing board are set to approximately 50°. The present invention is not, however, restricted to this, and the angle θ, θ' may be, as a matter of course, properly set to 40° or larger.

Moreover, in the third embodiment of the present invention, the facsimile apparatus has been exemplified as the image forming apparatus, however, the image forming apparatus can be used in a copying machine, a printer and a scanner etc. Further, in the third embodiment, the sheet material feeding device for sequentially singly feeding the sheet materials such as the original sheets as the reading target, has been exemplified. The present invention is not, however, limited to this device, and the same effect can be obtained by applying the present invention to, for instance, a sheet material feeding device for sequentially singly feeding to the recording portion the sheet materials such as the record sheets etc. as a recording target.

As discussed above, according to the present invention, the carry path for the sheet materials is formed substantially straight, and hence the sheet materials (having the comparatively large thickness such as the name card and the thick sheet etc.) are fed smoothly. Moreover, there is provided the regulating member for regulating the front edges of the sheet materials placed on the placing board and releasing the regulation thereof, and the angle θ of the carry path for the sheet materials to the installing surface of the apparatus (and further the angle θ' of the placing board to the installing surface of the apparatus) is set to 40° or greater. Hence, the user, when setting the sheet materials on the placing board, can simply set the sheet materials by putting the sheet materials down substantially from above by utilizing farther the gravity than ever before, and, whoever sets, the uniform setting of the sheet materials can be attained. Accordingly, the whole apparatus can be farther downsized as well as enhancing the setting characteristic of the sheet materials while ensuring the separating performance of the sheet materials.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An image forming apparatus comprising:

an image reading portion, provided in an upper portion of an apparatus body on the side of its front surface, for carrying an original sheet and reading image formation;

an optical signal generating portion, provided in rear of said image reading portion, for generating an optical signal on the basis of an image signal;

an image forming portion, disposed downwardly of said optical signal generating portion, for forming a toner image on a photosensitive body by irradiating said photosensitive body with the optical signal, and transferring the toner image onto a record sheet;

a fixing portion, disposed between said image forming portion and said image reading portion, for heating and fixing the toners transferred onto the record sheet;

a sheet discharge portion, disposed between said image forming portion, said optical signal generating portion and said image reading portion, to which to discharge the record sheet onto which the toner image is fixed by said fixing portion;

an opening/closing cover rotatable provided on said apparatus body and rotated integrally with said image reading portion and said sheet discharge portion;

a side cover for covering one side surface of said apparatus body;

a control portion provided along the inside of said side cover and including a control circuit for controlling the whole of said apparatus; and a cover member for closing an opening portion formed in said side cover, facing to said control portion, said cover member being so provided as to be attached to and detachable from said side cover or capable of opening and closing with respect to said side cover, wherein when said opening/closing cover is opened, said image forming portion is exposed and a part of a sheet carry path extending from said fixing portion to said sheet discharge portion is made open.

2. An image forming apparatus comprising:

pre-reading sheet stacking means capable of stacking a plurality of original sheets;

original sheet feeding means for singly separating and feeding the stacked original sheets;

image reading means for reading image information on the original sheets separated and fed by said original sheet feeding means;

an optical signal generating portion, provided in rear of said image reading means, for generating an optical signal on the basis of an image signal;

an image forming portion, disposed downwardly of said optical signal generating portion, for forming a toner image on a photosensitive body by irradiating said photosensitive body with the optical signal, and transferring the toner image onto a record sheet;

a fixing portion, disposed between said image forming portion and said image reading means, for heating and fixing the toners transferred onto the record sheet;

record sheet stacking means, to which to discharge the record sheets onto which the toner image is fixed by said fixing portion, for stacking the discharged record sheets, said record sheet stacking means being disposed between said image forming portion, and said optical signal generating portion and said image reading means as well as being disposed adjacent to said pre-reading sheet stacking means;

spacing means provided on a rear surface of said pre-reading sheet stacking means and facing said record sheet stacking means; and an opening/closing cover rotatably provided on said apparatus body and rotated integrally with said image reading means, said pre-reading sheet stacking means and said record sheet stacking means.

3. An image forming apparatus according to claim 2, wherein said pre-reading sheet stacking means and said spacing means are integrally composed of a mold material.

4. An image forming apparatus according to claim 2, wherein said spacing means is a member formed in a rib-like configuration.

5. An image forming apparatus according to claim 4, wherein said pre-reading sheet stacking means comprises at least two or more spacing means.

6. An image forming apparatus according to claim 5, wherein a height of said spacing means is over 1.5 times a wall thickness of said pre-reading sheet stacking means.

7. An image forming apparatus comprising:

an original sheet stacking portion capable of stacking original sheets;

original sheet feeding means for singly separating and feeding the stacked original sheets;

an image reading portion for reading image information on the original sheets separated and fed by said original sheet feeding means;

an optical signal generating portion, provided in rear of said image reading portion, for generating an optical signal on the basis of an image signal;

an image forming portion, disposed downwardly of said optical signal generating portion, for forming a toner image on a photosensitive body by irradiating said photosensitive body with the optical signal, and transferring the toner image onto a record sheet;

a fixing portion, disposed between said image forming portion and said image reading portion, for heating and fixing the toners transferred onto the record sheet;

a record sheet stacking portion, to which to discharge the record sheets onto which the toner image is fixed by said fixing portion, for stacking the discharged record sheets, said record sheet stacking portion being disposed between said image forming portion, said optical signal generating portion and said image reading portion as well as being disposed adjacent to said original sheet stacking portion;

spacing means provided on a back side of said original sheet stacking portion, said spacing means preventing the discharged recording sheet from being attracted to the back side of said original sheet stacking portion; and an opening/closing portion rotatably provided on said apparatus body and rotated integrally with said image reading portion, said original sheet stacking portion and said record sheet stacking portion.

8. An image forming apparatus comprising:

an original sheet stacking portion capable of stacking original sheets;

an image reading portion for carrying the original sheets from said original sheet stacking portion and reading image information therefrom;

an optical signal generating portion, provided in rear of said image reading portion, for generating an optical signal on the basis of an image signal;

an image forming portion, disposed downwardly of said optical signal generating portion, for forming a toner image on a photosensitive body by irradiating said photosensitive body with the optical signal, and transferring the toner image onto a record sheet;

a fixing portion, disposed between said image forming portion and said image reading portion, for heating and fixing the toners transferred onto the record sheet;

a record sheet stacking portion, to which to discharge the record sheets onto which the toner image is fixed by said fixing portion, for stacking the discharged record sheets, said record sheet stacking portion being disposed between said image forming portion, said optical signal generating portion and said image reading portion as well as being disposed adjacent to said original sheet stacking portion; and spacing means provided on a back side of said original sheet stacking portion, said spacing means preventing the discharged recording sheet from being attracted to the back side of said original sheet stacking portion.

9. An image forming apparatus comprising:

a placing board capable of stacking a plurality of original sheets and constructed so that a carry path for the original sheets is formed substantially straight and an angle of the carry path for the original sheets to an installing surface of said apparatus is over 40 degrees;

feeding means for singly separating and feeding the original sheets placed on said placing board;

regulating means for regulating front edges of the original sheets placed on said placing board and releasing the regulation thereof;

an image reading portion for reading image information on the original sheets separated and fed by said feeding means;

an optical signal generating portion, provided in rear of said image reading portion, for generating an optical signal on the basis of an image signal;

an image forming portion, disposed downwardly of said optical signal generating portion, for forming a toner image on a photosensitive body by irradiating said photosensitive body with the optical signal, and transferring the toner image onto a record sheet;

a fixing portion, disposed between said image forming portion and said image reading portion, for heating and fixing the toners transferred onto the record sheet;

a sheet discharge portion, to which to discharge the record sheets onto which the toner image is fixed by said fixing portion, said sheet discharge portion being disposed between said image forming portion, said optical signal generating portion and said image reading portion; and an opening/closing portion rotatably provided on said apparatus body and rotated integrally with said image reading portion and sheet discharge portion, wherein said feeding means switches over the regulation of the front edges of the original sheets and the release of the regulation by said regulating means.

10. An image forming apparatus according to claim 9, wherein said placing board is constructed so that a carry path is formed substantially straight together with the carry path for the sheet materials, and an angle θ' to an installing surface of said apparatus is over 40 degrees.

11. An image forming apparatus according to claim 9, wherein said feeding means includes at least a rotary body, and the regulation of the front edges of the sheet materials and the release of the regulation by said regulating means are switched over by rotations of said rotary body.

12. An image forming apparatus according to claim 11, wherein said placing board is capable of stacking over 15 sheet materials.

* * * * *

UNITED STATES PATENT AND TRADEMARK OFFICE
CERTIFICATE OF CORRECTION

PATENT NO. : 6,078,765
DATED : June 20, 2000
INVENTOR(S) : Tasashi Takano, et al It is certified that error appears in the above-indentified patent and that said Letters Patent is hereby corrected as shown below:

COLUMN 2:
   Line 28, "does not touch on" should read --do not touch--.
   Line 29, "in" should read --inserting--.

COLUMN 5:
   Line 54, "mad" should read --made--.

COLUMN 12:
   Line 51, "can not" should read --cannot--.
   Line 55, "can not" should read --cannot--.

COLUMN 19:
   Line 16, "separarated" should read --separated by--.

COLUMN 21:
   Line 22, "rotatable" should read --rotatably--.

Signed and Sealed this

Seventeenth Day of April, 2001

*Attest:*

NICHOLAS P. GODICI

*Attesting Officer*     *Acting Director of the United States Patent and Trademark Office*